(12) United States Patent
Asiri et al.

(10) Patent No.: US 11,618,010 B1
(45) Date of Patent: Apr. 4, 2023

(54) WATER SPLITTING CATALYST, AND METHODS OF PREPARATION THEREOF

(71) Applicant: King Abdulaziz University, Jeddah (SA)

(72) Inventors: Abdulla Mohamed Asiri, Jeddah (SA); Sher Bahadar Khan, Jeddah (SA); Hadi Mohammed Marwani, Jeddah (SA); Khalid Ahmed Alamry, Jeddah (SA); Waheed Abiodun Adeosun, Jeddah (SA)

(73) Assignee: KING ABDULAZIZ UNIVERSITY, Jeddah (SA)

( * ) Notice: Subject to any disclaimer, the term of this patent is extended or adjusted under 35 U.S.C. 154(b) by 0 days.

(21) Appl. No.: 17/690,513

(22) Filed: Mar. 9, 2022

(51) Int. Cl.
| | |
|---|---|
| *B01J 23/80* | (2006.01) |
| *C25B 11/061* | (2021.01) |
| *C25B 11/077* | (2021.01) |
| *C25B 1/02* | (2006.01) |
| *C25B 9/17* | (2021.01) |

(52) U.S. Cl.
CPC .............. *B01J 23/80* (2013.01); *C25B 1/02* (2013.01); *C25B 9/17* (2021.01); *C25B 11/061* (2021.01); *C25B 11/077* (2021.01)

(58) Field of Classification Search
CPC .. C25B 1/04; B01J 23/80; B01J 23/745; B01J 23/75
See application file for complete search history.

(56) References Cited

U.S. PATENT DOCUMENTS

| | | | |
|---|---|---|---|
| 10,472,722 B2 | 11/2019 | Takanabe et al. | |
| 10,501,855 B2 | 12/2019 | Cui et al. | |

FOREIGN PATENT DOCUMENTS

| | | |
|---|---|---|
| CN | 109806887 A | 5/2019 |
| CN | 10807087 B | 10/2020 |
| KR | 2019057787 A | 5/2019 |
| WO | 201815894 A1 | 11/2018 |

OTHER PUBLICATIONS

Zhang et al (Electrodeposited Nanostructured CoFe2O4 for Overall Water Splitting and Supercapacitor Applications, Catalysts, 9, 176, 2019, pp. 1-11) (Year: 2019).*

Kung et al ("Semiconducting oxide anodes in photoassisted electrolysis of water", Journal of Applied Physics, 48, 1977, pp. 2463-2469) (Year: 1977).*

(Continued)

*Primary Examiner* — Alexander W Keeling
(74) *Attorney, Agent, or Firm* — WCF IP

(57) ABSTRACT

A catalyst made of non-noble metals is provided. The catalyst includes oxides of cadmium, iron, and cobalt, represented by a general formula $CdFe_{2-3}Co_{1-3}O_{5-9}$. An electrocatalyst including conductive electrode dispersed with the catalyst is also provided. A method for preparing the catalyst of the formula $CdFe_{2-3}Co_{1-3}O_{5-9}$ is also provided. The electrocatalyst is used for the water-splitting process to obtain hydrogen and oxygen.

12 Claims, 27 Drawing Sheets

(56) References Cited

OTHER PUBLICATIONS

Rahman et al ("Impact of doping on Structural, Electronic and Optical Properties of Cobalt Ferrite Prepared by Solid-state Reaction", International Journal of Innovative Research in Advanced Engineering, vol. 2, issue 1, 2015, pp. 99-107) (Year: 2015).*

Sayeed et al ("Electrodeposition at Highly Negative Potentials of an Iron-Cobalt Oxide Catalyst for Use in Electrochemical Water Splitting", ChemPhysChem, 20, 2019, pp. 3112-3119). (Year: 2019).*

Fatma Mohamed et al. "Reusability and stability of a novel ternary (Co—Cd—Fe)-LDH/Pbl2 photoelectrocatalytst for solar hydrogen production." Mar. 10, 2021, vol. 11, Issue 1, pp. 1-14.

Rabei M. Gabr et al., "Effect of cadmium cobalt iron spinel (CoxCd1—xFe2O4) 0 .Itoreq. x .Itoreq. 1 formation on the kinetics of catalytic decomposition of hydrogen peroxide over cobalt-cadmium-iron mixed oxide systems.", May 1, 2021, vol. 7, Issue 8, pp. 1642-1646.

Shaik Gouse Peera et al., "Cobalt Nanoparticle-Embedded Nitrogen-Doped Carbon Catalyst Derived from a Solid-State Metal-Organic Framework Complex for OER and HER Electrocatalysis.", Mar. 1, 2021, vol. 14, Issue 5, pp. 1-14.

Can Lin et al., "An iron-doped cobalt phosphide nano-electrocatalyst derived from a metal—organic framework for efficient water splitting." Oct. 7, 2019, vol. 48, Issue No. 44, p. 16555-16561.

Nehru Boda et al. "Structural, morphological and electronic properties of cadmium cobalt ferrite nanoparticles", Nov. 21, 2019, vol. 10, Issue No. 1, p. 4752-4763.

* cited by examiner

| Element | Weight (%) | Atomic (%) |
|---------|------------|------------|
| O | 17.26 | 43.47 |
| Cd | 20.26 | 13.12 |
| Co | 44.09 | 30.14 |
| Fe | 18.39 | 13.27 |

FIG. 2E

WATER SPLITTING CATALYST, AND METHODS OF PREPARATION THEREOF

TECHNICAL FIELD

The present disclosure relates to the field of catalysts, and more specifically, the present disclosure relates to water-splitting catalysts to generate hydrogen and oxygen gases, and methods for preparing the water-splitting catalyst.

BACKGROUND

The quest for sustainable development and meeting growing energy demand in an environment-friendly way has led to interest in renewable and clean energy sources. In recent years, much attention has been given to energy generation through electrolytic water splitting because of surplus availability and the environmentally friendly nature of water. However, a large amount of electric current is needed to drive the electrolytic process, thereby making this process cost-intensive.

Conventional methods to aid the electrolytic process involved the use of noble metal-based electrocatalysts such as $RuO_2/IrO_2$ and PtO/PdO. However, the scarcity of these noble metal-based materials and their high cost make them unattractive for large-scale water splitting applications. Also, conventional processes, such as wet chemical method, adopted to prepare the noble metals-based electrocatalysts are cumbersome, and involve the use of solvents that are harmful for the environment. In addition, the conventional catalyst does not possess the overpotential needed for oxygen evolution reaction (OER) and hydrogen evolution reaction (HER) during the water-splitting process. Hence there exists a need to develop an effective catalyst operating at low overpotential for OER and HER with high stability at long-hour continuous usage.

SUMMARY

The present disclosure relates to a catalyst. The catalyst can be used for the electrolysis of water to produce hydrogen and oxygen. The present disclosure also relates to a method of preparing the catalyst and the electrocatalyst.

In one aspect of the present disclosure, the catalyst includes oxides of cadmium, iron, and cobalt, represented by a general formula $CdFe_{2-3}Co_{1-3}O_{5-9}$. The iron oxide may be iron (II) oxide, iron (III) oxide, or iron (II, III) oxide. In one embodiment, the iron oxide is iron (II) oxide. The cobalt oxide may be cobalt (II) oxide, cobalt (III) oxide, cobalt (II, III) oxide, and a combination thereof. In one embodiment, the catalyst compound is $CdFe_2Co_3O_8$. In another embodiment, the catalyst $CdFe_2Co_3O_8$ has an average crystalline size of about 72 nanometers.

In one embodiment, cadmium oxide, cobalt oxide, and iron oxide are non-porous cubic nanostructures. The nanostructures include at least one selected from nanowires, nanoparticles, nanoclusters, nanocrystals, or a combination thereof. In an embodiment, the catalyst $CdFe_2Co_3O_8$ comprises the cadmium oxide with a weight percentage of 24.32%, the cobalt oxide with a weight percentage of 45.59%, and the iron oxide with a weight percentage of 30.23%.

In an aspect of present disclosure, an electrocatalyst includes a conductive electrode dispersed with the catalyst $CdFe_{2-3}Co_{1-3}O_{5-9}$. The conductive electrode may be a gold electrode. In one embodiment, the electrocatalyst is used in the water-splitting process.

In another aspect of the present disclosure, a method of preparing the catalyst of the formula $CdFe_{2-3}Co_{1-3}O_{5-9}$ is described. The method includes stirring an equimolar mixture of at least one cadmium salt, iron salt, and cobalt salt in sodium hydroxide (NaOH) to obtain a first mixture. In one embodiment, the method includes stirring the equimolar mixture for a period of 60 minutes. In some embodiments, the cadmium salt is $Cd(NO_3)_2$, iron salt is $FeCl_2$, and cobalt salt is $Co(NO_3)_2$. The method also includes annealing the first mixture to obtain the catalyst. In an embodiment, annealing was performed at a temperature range of 500-600° C. for a period of 7-9 hours with continuous heating at the rate of 5° C./min. In an embodiment, the catalyst is $CdFe_2Co_3O_8$.

In yet another aspect of the present disclosure, a method to prepare an electrocatalyst is described. The method includes dissolving the catalyst $CdFe_2Co_3O_8$ in an organic solvent to obtain a slurry. The slurry was further dispersed over a conductive electrode in the presence of a polymer matrix to obtain the electrocatalyst. In one embodiment, the polymer matrix is the sulfonated tetrafluoroethylene-based fluoropolymer (nafion). In another embodiment, the conductive electrode is a gold electrode.

The foregoing as well as other features and advantages of the present disclosure will be more fully understood from the following description, examples, and claims.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 2E shows the elemental composition of the $CdFe_2Co_3O_8$ catalyst;

DETAILED DESCRIPTION

Figure 1:
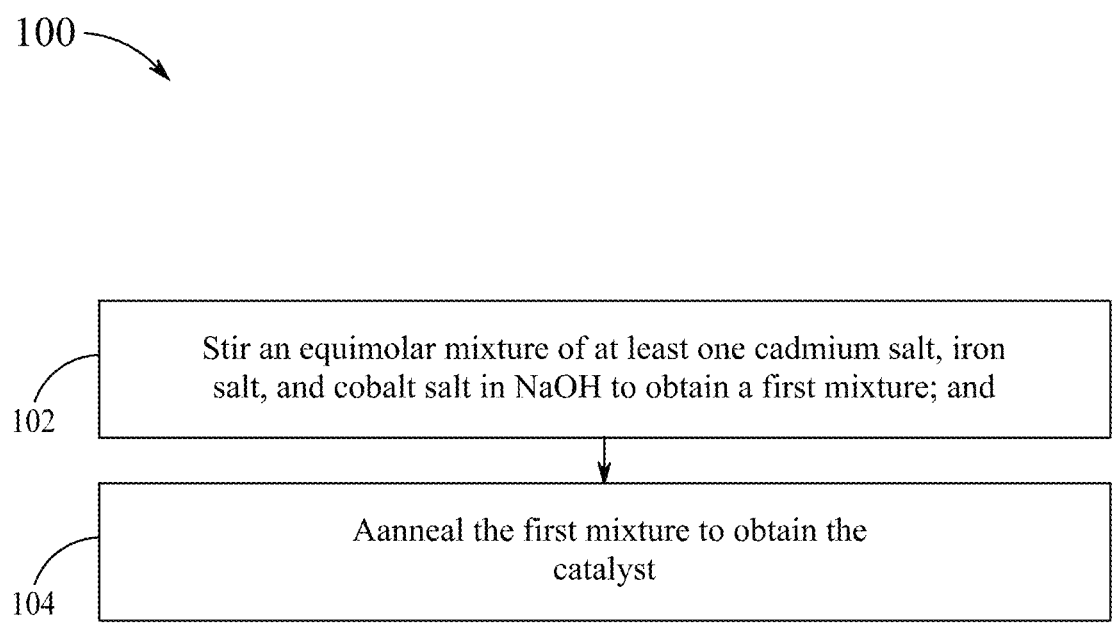
FIG. 1 is an exemplary flowchart illustrating a method for preparing $CdFe_2Co_3O_8$ catalyst.

Reference will now be made in detail to specific embodiments or features, examples of which are illustrated in the accompanying drawings. Wherever possible, corresponding or similar reference numbers will be used throughout the drawings to refer to the same or corresponding parts. Moreover, references to various elements described herein, are made collectively or individually when there may be more than one element of the same type. However, such references are merely exemplary in nature. It may be noted that any reference to elements in the singular may also be construed to relate to the plural and vice-versa without limiting the scope of the disclosure to the exact number or type of such elements. A skilled artisan will appreciate that various alternate embodiments and forms may be prepared. Examples, therefore, given are only for illustration purposes without any intention to restrict the embodiments to a given set of examples. Specific functional aspects are provided merely to enable a person skilled in the art to perform the invention and should not be construed as limitations of the invention. Any method steps and processes described herein are not to be construed as necessarily requiring their performance in the particular order discussed or illustrated, unless specifically identified as an order of performance. It is also to be understood that additional or alternative steps may be employed, unless otherwise indicated.

As used herein, "oxygen evolution reaction (OER)" refers to a half-reaction in water splitting that results in oxygen evolution and is signaled by an increase in anodic current.

As used herein, "hydrogen evolution reaction (HER)" refers to a half-reaction in a water-splitting process that results in the evolution of hydrogen gas and is signaled by an increase in reduction current.

The term "reversible hydrogen electrode (RHE)" refers to a reference electrode in an electrochemical process. It measures potential changes with pH, and therefore can be directly used in the electrolyte.

As used herein, "overpotential" refers to a potential difference between a reduction potential of thermodynamically determined half-reaction and experimentally determined half-reaction.

As used herein, "electrocatalyst" refers to a specific form of catalysts that function at electrode surfaces or, most commonly, may be the electrode surface itself.

As used herein, "ternary composite" refers to a composition of three different materials.

As used herein, "working electrode" refers to the electrode in an electrochemical cell/device/biosensor on which the electrochemical reaction of interest is occurring.

As used herein, "counter-electrode", is an electrode used in an electrochemical cell for voltametric analysis or other reactions in which an electric current is expected to flow.

As used herein, "selectivity" is the quality of the electrochemical response that can be achieved without interference for any other substance.

As used herein, "sensitivity" is the change in the electrochemical response with regard to a change in the concentration of the analyte.

As used herein, "amount" refers to the level or concentration of one or more elements or end-products of the system and the methods of the present disclosure.

The use of the singular herein includes the plural (and vice versa) unless specifically stated otherwise.

The use of the terms "include," "includes", "including," "have," "has," or "having," "comprise," "comprises," "comprising" or the like should be generally understood as open-ended and non-limiting unless specifically stated otherwise.

It is understood that the order of steps or order for performing certain actions can be changed so long as the intended result is obtained. Moreover, two or more steps or actions may be conducted simultaneously.

As used herein, the term "about" or "between" refers to a ±20% to ±10% variation from the nominal value unless otherwise indicated.

Embodiments of the present disclosure are directed towards a catalyst. The catalyst includes oxides of cadmium, iron, and cobalt and is represented by a general formula $CdFe_{2-3}Co_{1-3}O_{5-9}$. The catalyst is used for the electrolysis of water to form hydrogen and oxygen to generate renewable energy with minimal harm to the environment. This process is called electrochemical water splitting. Electrochemical water splitting is an important process for the generation of hydrogen as it involves two heterogeneous multi-step half-reactions, which are termed the cathodic hydrogen evolution reaction (HER) and the anodic oxygen evolution reaction (OER). The catalyst of the present disclosure provides an improved catalytic activity towards OER and HER activities, with stability for long durations (upto 12 hours). Also, the raw materials (metal oxides) used for the preparation of the catalyst are much cheaper than the noble metals that are conventionally used in the catalysts. Also, the catalyst has a uniform, highly ordered cubic surface that allows higher surface area for reaction.

In an embodiment, the iron oxide present in the catalyst may be iron (II) oxide, iron (III) oxide, or iron (II, III) oxide. In another embodiment, the iron oxide present in the catalyst may be iron (II) oxide. Iron oxide is a multi-functional semi-conductor that possess high catalytic property due to its high surface area and good conductivity. In an embodiment, the percentage of iron oxide present in the catalyst may be 30.23%. The cobalt oxide present in the catalyst may be cobalt (II) oxide, cobalt (III) oxide, or cobalt (II, III) oxide. Cobalt (III) oxide has a variable oxidation state that provides an advantage during redox reactions giving it an excellent redox property. In an embodiment, the percentage of cobalt oxide present in the catalyst may be 45.59%. Cadmium oxide is a robust catalyst material; it is an n-type semiconductor that had unique chemical and thermal stability and also provides high surface area. In an embodiment, the percentage of cadmium oxide may be 24.32%. Thus, a combination of iron oxide, cadmium oxide, and cobalt oxide provides a variety of advantages and has excellent catalytic properties. Further, these metals are easy to obtain and inexpensive.

In one embodiment, the catalyst is $CdFe_2Co_3O_8$. The catalyst $CdFe_2Co_3O_8$ provides excellent surface properties and forms a well-balanced shape. In an embodiment, the catalyst $CdFe_2Co_3O_8$ has an average crystalline size of about 64 nanometers. In another embodiment, the catalyst $CdFe_2Co_3O_8$ has an average crystalline size of about 72 nanometers. In yet another embodiment, the catalyst $CdFe_2Co_3O_8$ has an average crystalline size of about 80 nanometers. The cadmium oxide, cobalt oxide, and iron oxide present in the catalyst may have a non-porous cubic nanostructure. In an embodiment, the nanostructures include at least one selected from nanowires, nanoparticles, nanoclusters, nanocrystals, or combinations thereof.

In an aspect of the present disclosure, a method 100 for preparing the catalyst of the formula $CdFe_{2-3}Co_{1-3}O_{5-9}$ is disclosed. The method 100 includes stirring an equimolar mixture of at least one cadmium salt, iron salt, and cobalt salt in NaOH to obtain a first mixture 102. The stirring 102 may be performed for a period of 60 minutes. In one embodiment, the molar ratio of at least one cadmium salt, iron salt, cobalt salt, and NaOH is 1:1:1:1 respectively. In one embodiment, the cadmium salt is $Cd(NO_3)_2$, iron salt is $FeCl_2$, and cobalt salt is $Co(NO_3)_2$. The metals salts are mixed properly to make uniform distribution throughout the first mixture. In an embodiment, the first mixture may be subjected to the milling process. In another embodiment, the milling process may be manual milling, cylindrical milling, face milling, etc. The method for preparing the catalyst of the formula $CdFe_{2-3}Co_{1-3}O_{5-9}$ also includes annealing the first mixture to obtain the catalyst.

The method 100 further includes 104 annealing the first mixture to obtain the catalyst. In an embodiment, annealing 104 the first mixture may be performed at a temperature ranging from about 500° C. to about 600° C. In another embodiment, annealing 104 the first mixture may be performed at a temperature ranging from about 530° C. to about 570° C. In yet another embodiment, annealing 104 the first mixture may be performed at a temperature range of about 550° C. The annealing process may be formed in a furnace such as, but not limited to, muffle furnace, gas-fired box furnace, high-temperature box furnace, etc. In an embodiment, annealing 104 the first mixture may be performed for a period of about 6-10 hours. In another embodiment, annealing the first mixture may be performed for a period of about 7-9 hours. In yet another embodiment, annealing the first mixture may be performed for a period of about 8 hours. In some embodiments, annealing the first mixture may be performed with a heating rate of 5° C./min. In some embodiments, the catalyst may be $CdFe_2Co_3O_8$.

The method of preparing the catalyst is a solventless solid-state synthesis which has an aid over the conventional wet chemical processes, solvothermal method, an electrodeposition method used for the preparation of the non-noble metal based electrocatalysts. The conventional methods suffer some drawbacks such as difficult processing, high cost of equipment and excess solvents. The method of the present disclosure provides a fast and easy method for formation of the catalytic nanoparticles. Also, it exposes the surface area of the nanoparticles and allows intercalation of metal ion precursors. The catalyst thus formed is highly effective in the electrolysis process.

The present disclosure also describes an electrocatalyst used in the water-splitting process. The electrocatalyst may include a conductive electrode dispersed with the catalyst $CdFe_{2-3}Co_{1-3}O_{5-9}$. In an embodiment, the conductive electrode may be a gold electrode. The gold electrode may be prepared by depositing a gold plating on a substrate. The gold electrode along with the catalyst provides good surface properties for the electrocatalysis of water. In another aspect of the present disclosure, a method to prepare the electrocatalyst is disclosed. The method includes dissolving the catalyst $CdFe_2Co_3O_8$ in an organic solvent to obtain a slurry. In some embodiments, the organic solvent may be an ethanol solution. The method of preparing the electrocatalyst further includes dispersing the slurry over a conductive electrode in the presence of a polymer matrix to obtain the electrocatalyst. In one embodiment, the polymer matrix may be sulfonated tetrafluoroethylene-based fluoropolymer (nafion). In another embodiment, the conductive electrode is a gold electrode. The gold electrode may be washed thoroughly with distilled water and is treated electrochemically to remove all the impurities and unwanted particles present on the surface of the gold electrode.

The electrocatalyst obtained by the method of the present invention provides better water-splitting results by developing the desired OER and HER reactions in the electrolysis process. The electrocatalyst operates at very low overpotential for the OER and HER reaction and hence provides high stability and long hour usage of the catalyst. The metals used for the formation of the catalyst are non-noble metal based electrocatalysts and inexpensive thereby making the overall process cost-friendly.

EXAMPLES

The disclosure will now be illustrated with examples, which are intended to illustrate the working of disclosure and not intended to take restrictively to imply any limitations on the scope of the present disclosure.

Example 1: Process for the Preparation of $CdFe_2Co_3O_8$ Catalyst

The present disclosure is consistent with the recent trend in non-noble-based electrocatalysts for water splitting applications. In a typical procedure, a ternary composite of $CdFe_2Co_3O_8$ was synthesized by solventless solid-state reaction. The molar ratio of the starting materials for the composite was maintained at 1:1:1:1 for $Cd(NO_3)_2$, $FeCl_2$ and $Co(NO_3)_2$ and NaOH respectively. The mixtures were manually milled in-situ using mortar and pestle for about 60 minutes to reveal the active sites and homogenize the mixtures. This process ensures uniform distribution and intercalation of metal precursors ($Cd^{2+}$, $Fe^{2+}$ and $Co^{3+}$). After manual milling, there was a subsequent change in coloration from light brown to grey. The precursor mixture was annealed at 550° C. in the muffle furnace for 8 hours with continuous heating at an increasing rate of 5° C./min. To serve as a control, other materials such as $Fe_2Co_3O_7$ binary composite, $CdFe_2O_4$ binary composite, and undoped $CO_3O_4$ were synthesized by the same method as described above.

Example 2: Process for the Preparation of $CdFe_2Co_3O_8$ Modified Gold Electrode for Water Splitting Studies Prior to use, the gold electrode (GE) was polished with 0.3 micromolar (μM) alumina slurry and thoroughly washed with distilled water. To remove likely adsorbed ions, the GE was electrochemically cleaned by a cyclic voltammetric sweep in 0.25 molar (M) sulfuric acid. 0.1 milligram (mg) of $CdFe_2Co_3O_8$ nanocomposite was weighed and dispersed in a 5% ethanolic solution. The dispersed $CdFe_2Co_3O_8$ nanocomposite was then cast on GE with the aid of one drop of nafion binder. For the control study, the binary composites ($CdFe_2O_4$ and $Fe_2Co_3O_7$) and undoped $CO_3O_4$ were prepared using the aforementioned procedures. The as-prepared GE was allowed to cool at the ambient temperature and stored until use.

Results and Discussion
Examination of Optical Characteristics

The synthesized catalyst $CdFe_2Co_3O_8$ was further characterized by X-ray diffraction (XRD), X-ray photoelectron spectroscopy (XPS), energy-dispersive X-ray spectroscopy (XEDS), field emission electron microscopy (FESEM) and Fourier transform infrared spectroscopy (FT-IR). The structural and morphological properties of $CdFe_2Co_3O_8$ were investigated with XRD and FESEM respectively while elemental analysis and functionality were investigated by XEDS/XPS and FT-IR respectively.

Figure 2A:
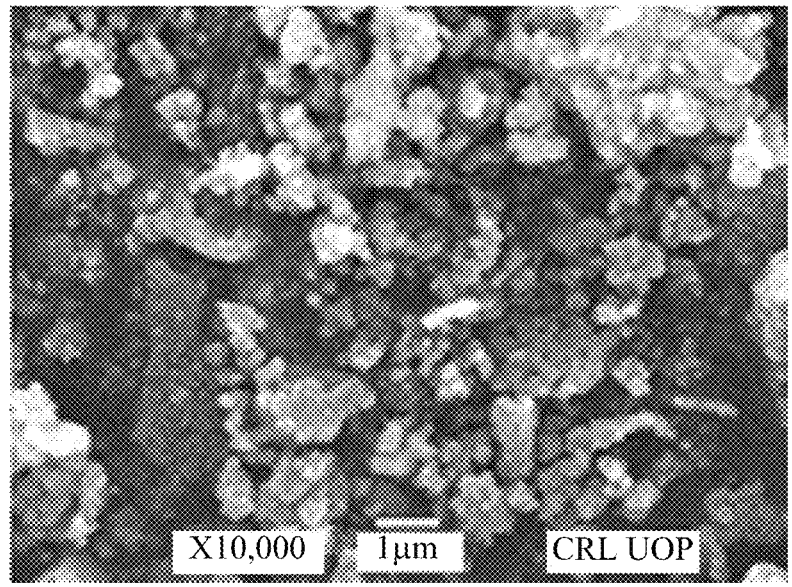
FIG. 2A shows field emission scanning electron microscopy (FESEM) images of the $CdFe_2Co_3O_8$ catalyst at a scale of 1 micrometer (μm)
Figure 2B:
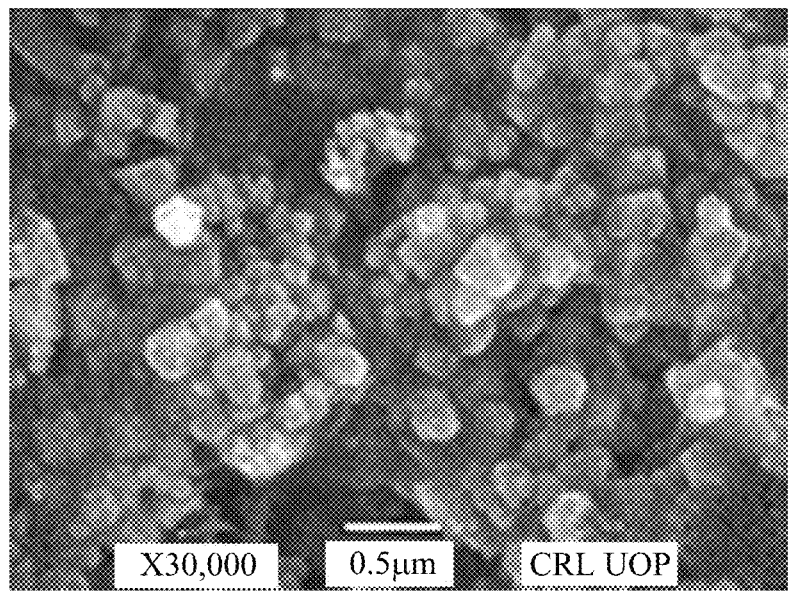
FIG. 2B FESEM images of the $CdFe_2Co_3O_8$ catalyst at a scale of 0.5 μm.
Figure 2C:
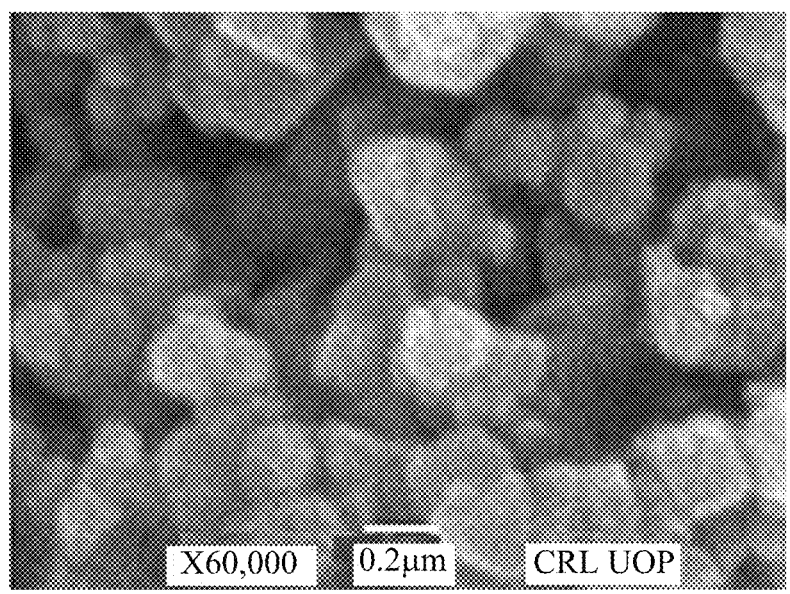
FIG. 2C shows FESEM images of the $CdFe_2Co_3O_8$ catalyst at a scale of 0.2 μm.
Figure 2D:
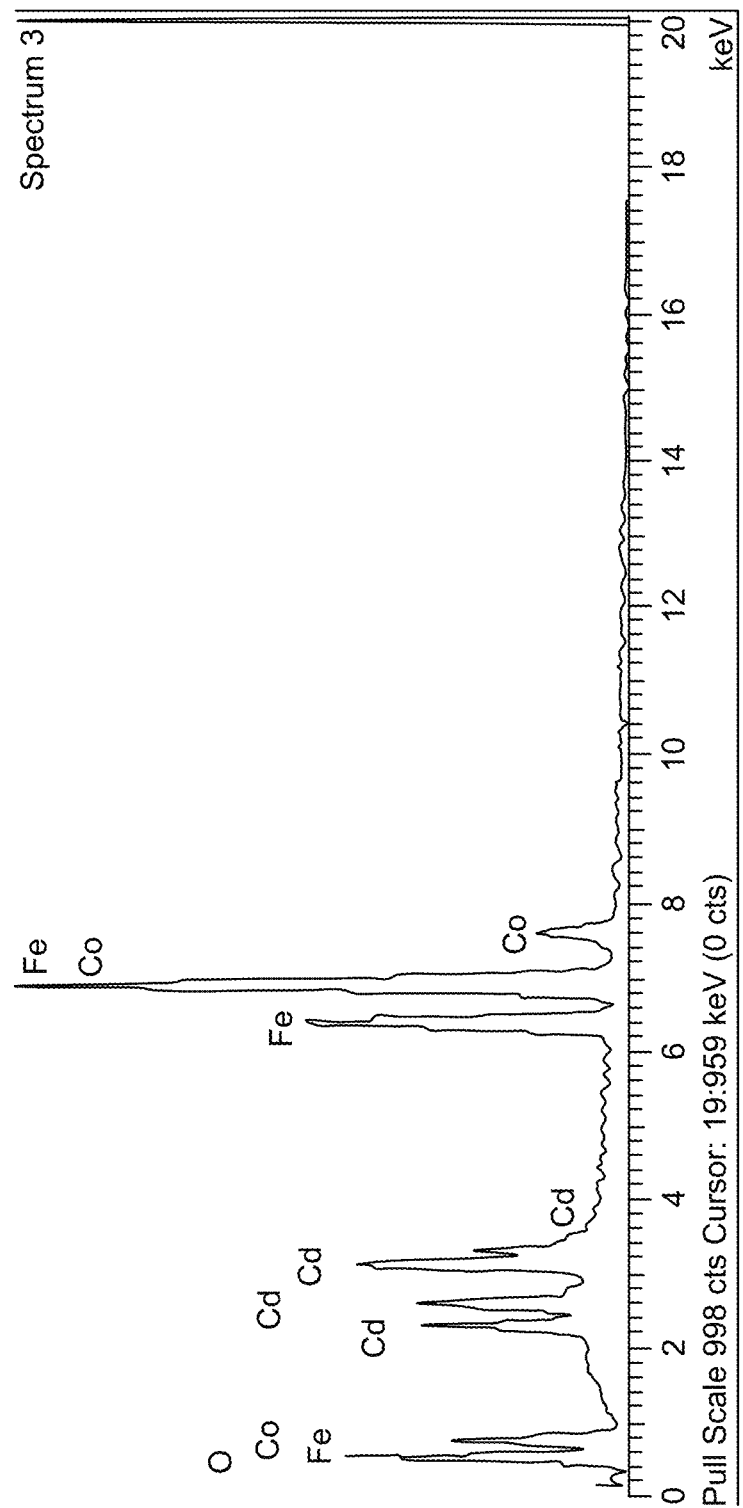
FIG. 2D shows energy-dispersive X-ray spectroscopy (EDXS) of the $CdFe_2Co_3O_8$ catalyst.
Figure 3A:
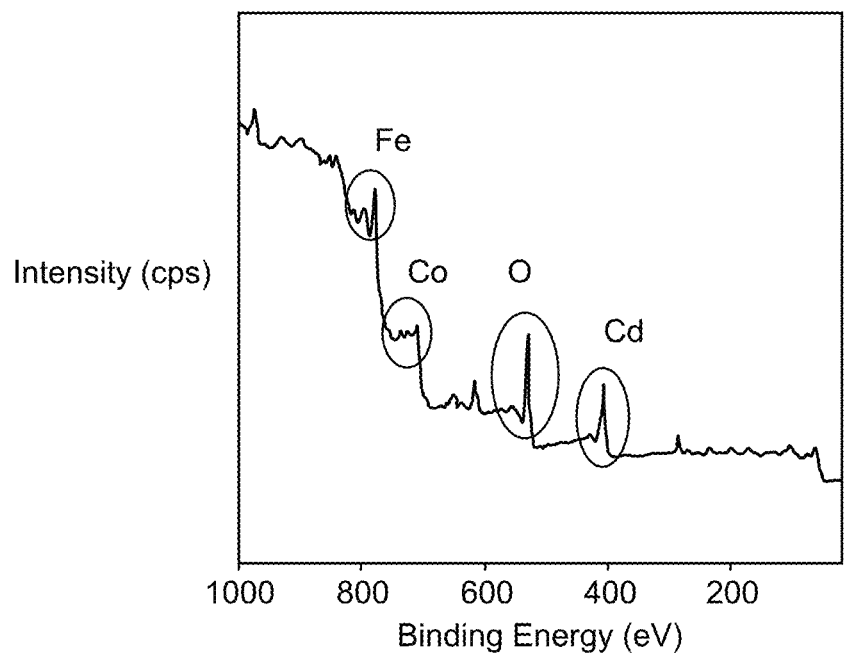
FIG. 3 shows X-ray photoelectron spectroscopy (XPS) showing the elemental, composition, chemical state, and binding energy of the $CdFe_2Co_3O_8$ catalyst.
Figure 3B:
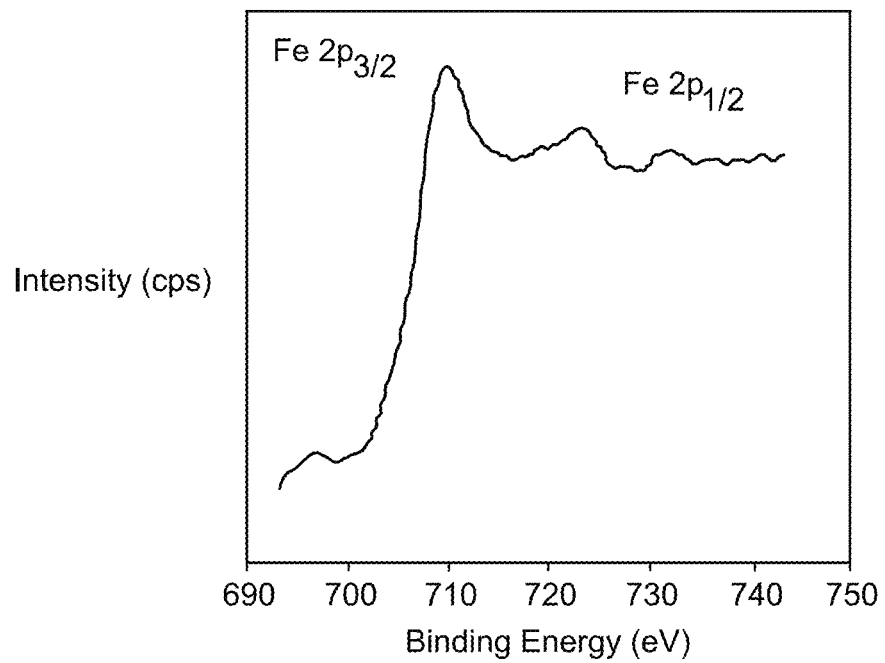
Figure 3C:
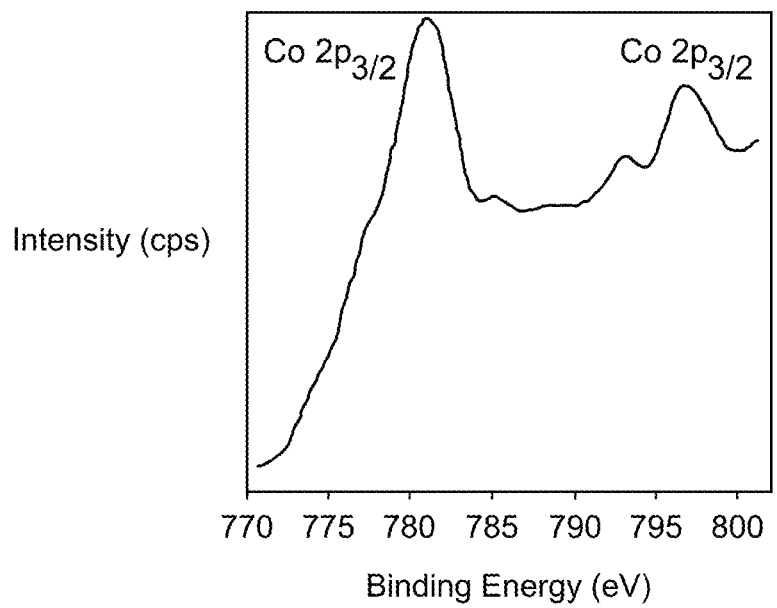
Figure 3D:
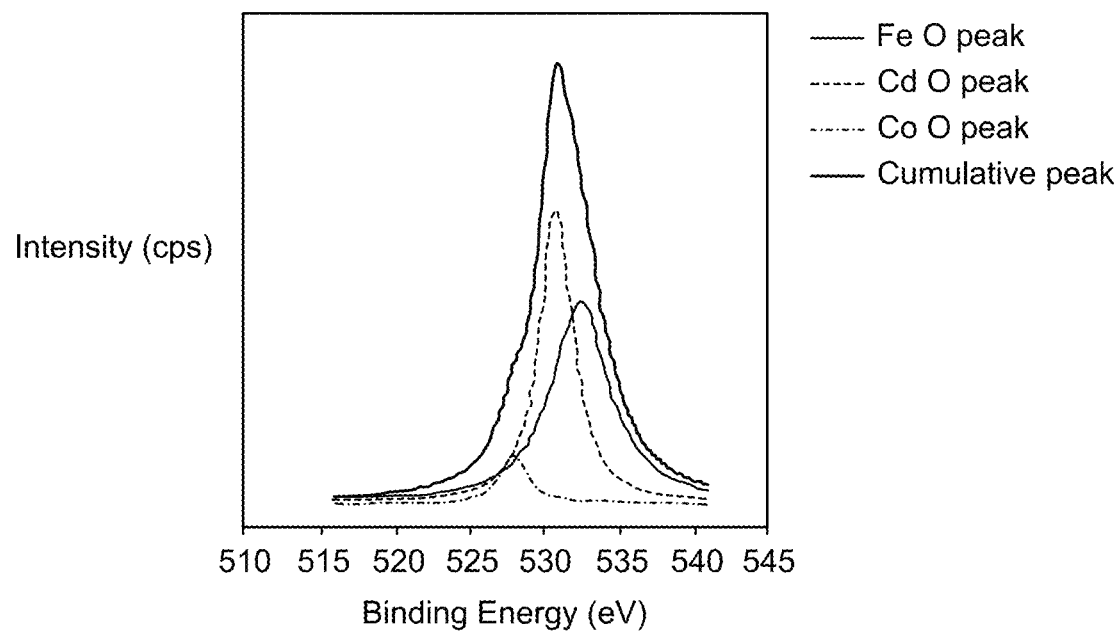
Figure 3E:
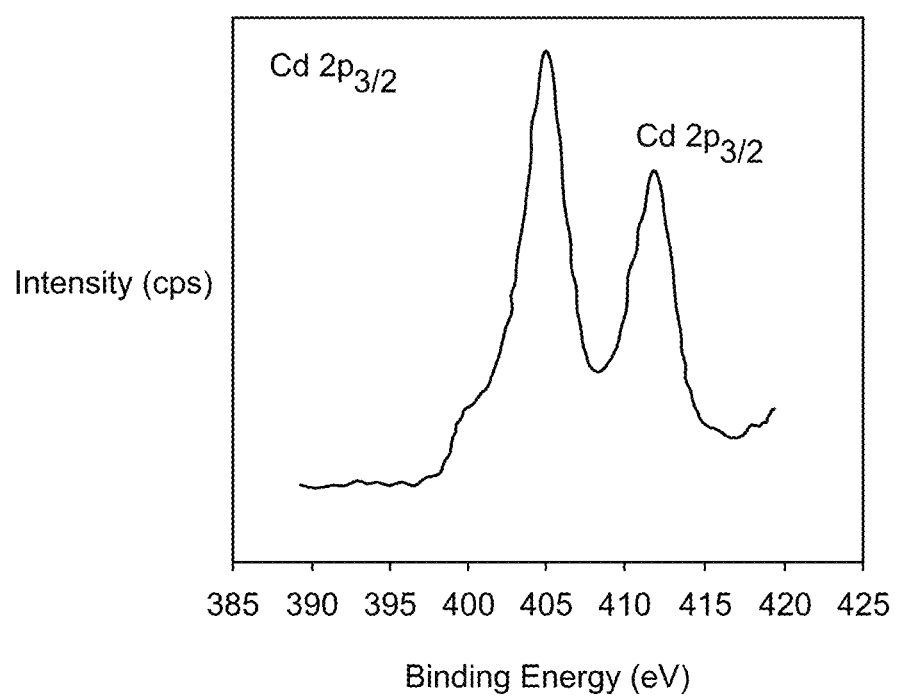

FIG. 2A, FIG. 2B, and FIG. 2C show FESEM images of the $CdFe_2Co_3O_8$ catalyst. The FESEM images show the morphology of the $CdFe_2Co_3O_8$ catalyst. FIG. 2A to FIG. 2C reveal the formation of cubic-like non-porous nanostructures. The catalyst $CdFe_2Co_3O_8$ exhibits a considerable crystalline structure with an average crystal size of 72 nanometers (nm). FIG. 2D shows XEDS image of the $CdFe_2Co_3O_8$ catalyst. This is a characterization technique providing elemental composition of various constituent elements in the catalyst, and the results of the same are presented in FIG. 2E. As can be observed from the FIG. 2E, the weight percentages of oxygen, cadmium, cobalt and iron is 17.26%, 20.26%, 44.09%, and 18.30%, respectively, relative to a total weight of the catalyst.

FIG. 3 is an XPS spectrum showing the elemental composition, chemical state, and binding energy of the $CdFe_2Co_3O_8$ catalyst. The obtained spectra in FIG. 3 show the presence of Cd, Fe, Co, and O without any other element and the obtained binding energies are consistent with the binding energy for Cd, Fe, and Co, as reported in literature. In addition to this, the deconvoluted oxygen spectrum indicates deconvoluted peaks for Co—O, Cd—O, and Fe—O peaks. The obtained result is consistent with the previous result for Co—O, Cd—O, and Fe—O. These results confirm the successful synthesis of the $CdFe_2Co_3O_8$ catalyst.

Figure 4:
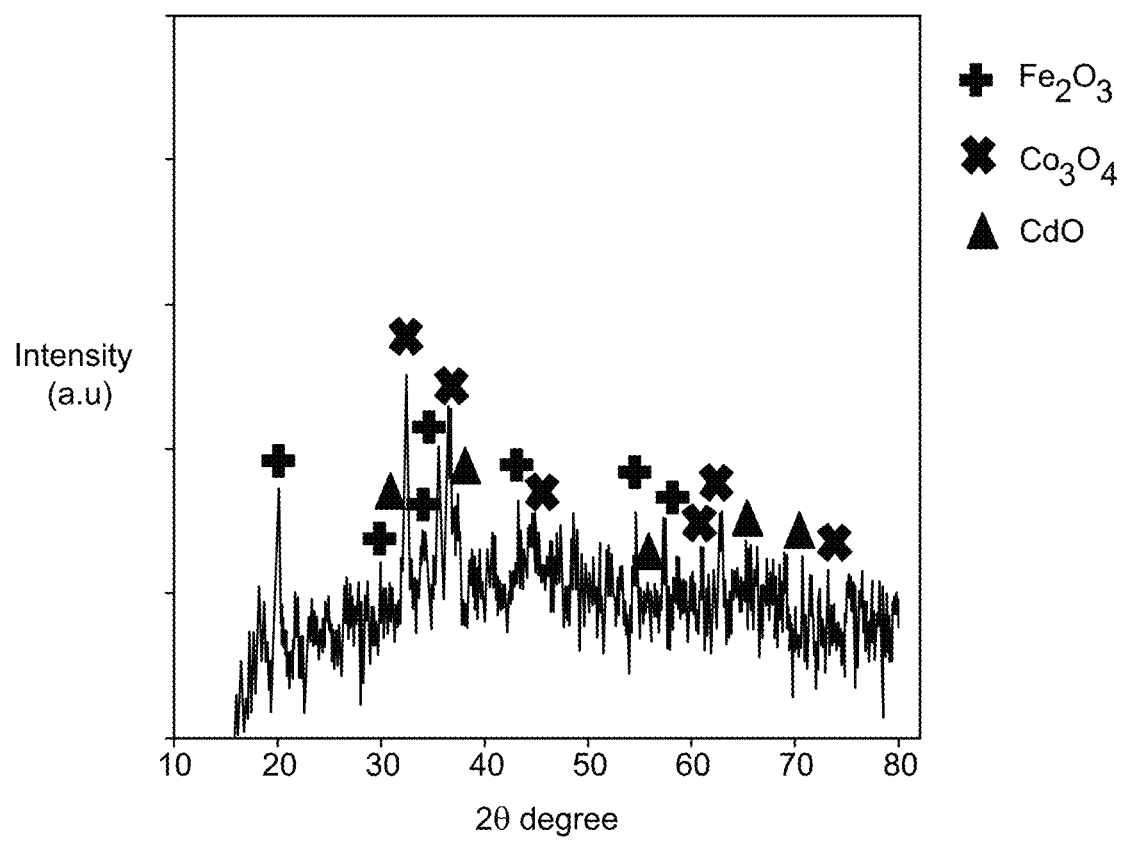
FIG. 4 shows X-ray diffraction results of the $CdFe_2Co_3O_8$ catalyst.

FIG. 4 show show XRD results of the $CdFe_2Co_3O_8$ catalyst. The XRD spectrum of the $CdFe_2Co_3O_8$ catalyst is presented in FIG. 4. From the FIG. 4 it can be observed that characteristic peaks at 2θ angle are 20.2°, 30.1°, 35.11°, 37.2°, 43.09°, 52.14°, and 57.39° corresponding to crystal phases of (111), (220), (311), (222), (400, (422) and (511) respectively which are peculiar to the rhombic structure of $Fe_2O_3$ [M. A. Vargas, J. E. Diosa, E. Mosquera, Data on a study of hematite nanoparticles obtained from Iron(III) oxide by the Pechini method, Data Br. 25 (2019) 0-6]. Likewise, the cubic phase of $CO_3O_4$ is exhibited at 2θ angle of 32.0°, 37.8°, 44.6°, 61.8°, 63.9°, and 73.9° corresponding to phases (220), (311), (400), (511), (440), (533) respectively [D. D. M. Prabaharan, K. Sadaiyandi, M.

Mahendran, S. Sagadevan, Precipitation method and characterization of cobalt oxide nanoparticles, Appl. Phys. A Mater. Sci. Process. 123 (2017)]. Also, the observed diffraction peaks at 2θ angle of 32.2°, 38.1°, 55.38°, 65.2°, and 70.3° corresponding to phases (111), (200), (220), (311), and (222) respectively could be attributed to CdO cubic phases [S.

Kumar, B. Ahmed, A. K. Ojha, J. Das, A. Kumar, Facile synthesis of CdO nanorods and exploiting its properties towards supercapacitor electrode materials and low power UV irradiation driven photocatalysis against methylene blue dye, Mater. Res. Bull. 90 (2017) 224-231].

Figure 5:
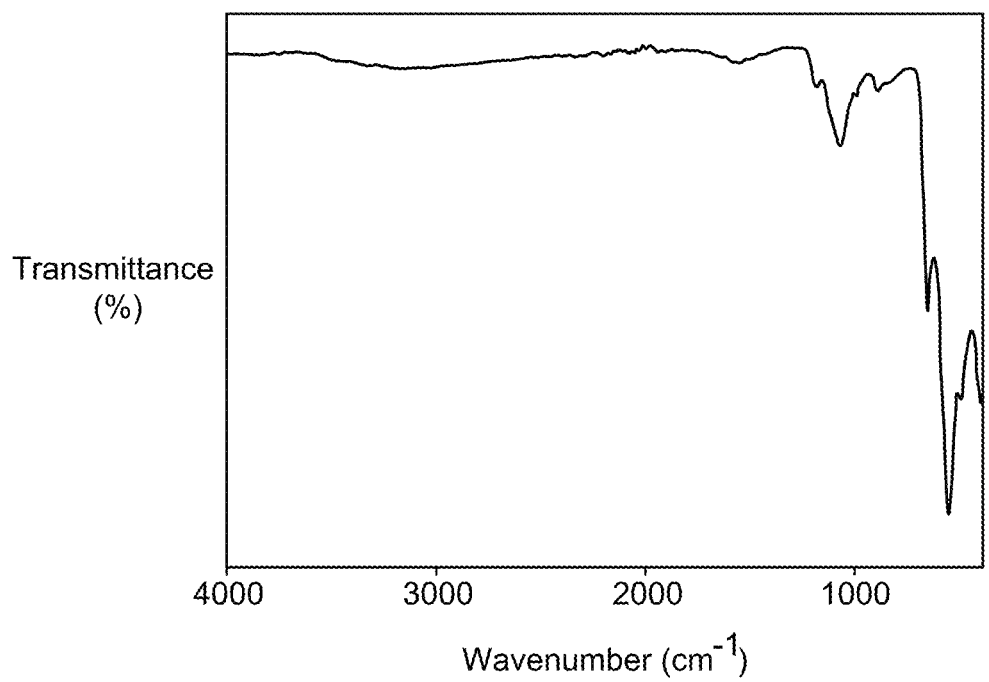
FIG. 5 shows fourier transform infrared spectroscopy (FT-IR) of the $CdFe_2Co_3O_8$ catalyst.

FIG. 5 shows FT-IR spectrum of the $CdFe_2Co_3O_8$ catalyst. The obtained FT-IR spectrum as displayed in FIG. 5 reveal peaks at the fingerprint region of the IR spectrum as peculiar to metal oxides. Specifically, the peaks at 1050 $cm^{-1}$ and 790 $cm^{-1}$ correlate to the metal-oxygen stretch of Cd—O and Fe—O [M. A. Vargas, J. E. Diosa, E. Mosquera, Data on a study of hematite nanoparticles obtained from Iron(III) oxide by the Pechini method, Data Br. 25 (2019) 0-6, K. J. Arun, K. S. Kumar, A. K. Batra, M. D. Aggarwal, P. J. J. Francis, Surfactant Free Hydrothermal Synthesis of CdO Nanostructure and Its Characterization, Adv. Sci. Eng. Med. 7 (2015) 771-775]. Likewise, the observed peak at 480 $cm^{-1}$ and 560 $cm^{-1}$ can be ascribed to stretching vibrations of Fe—O ($Fe_2O_3$), Co—O ($CO_3O_4$) [S.

Vijayakumar, A. Kiruthika Ponnalagi, S. Nagamuthu, G. Muralidharan, Microwave-assisted synthesis of $CO_3O_4$ nanoparticles for high-performance supercapacitors, Electrochim. Acta. 106 (2013) 500-505] and Cd—O.

Figure 6:
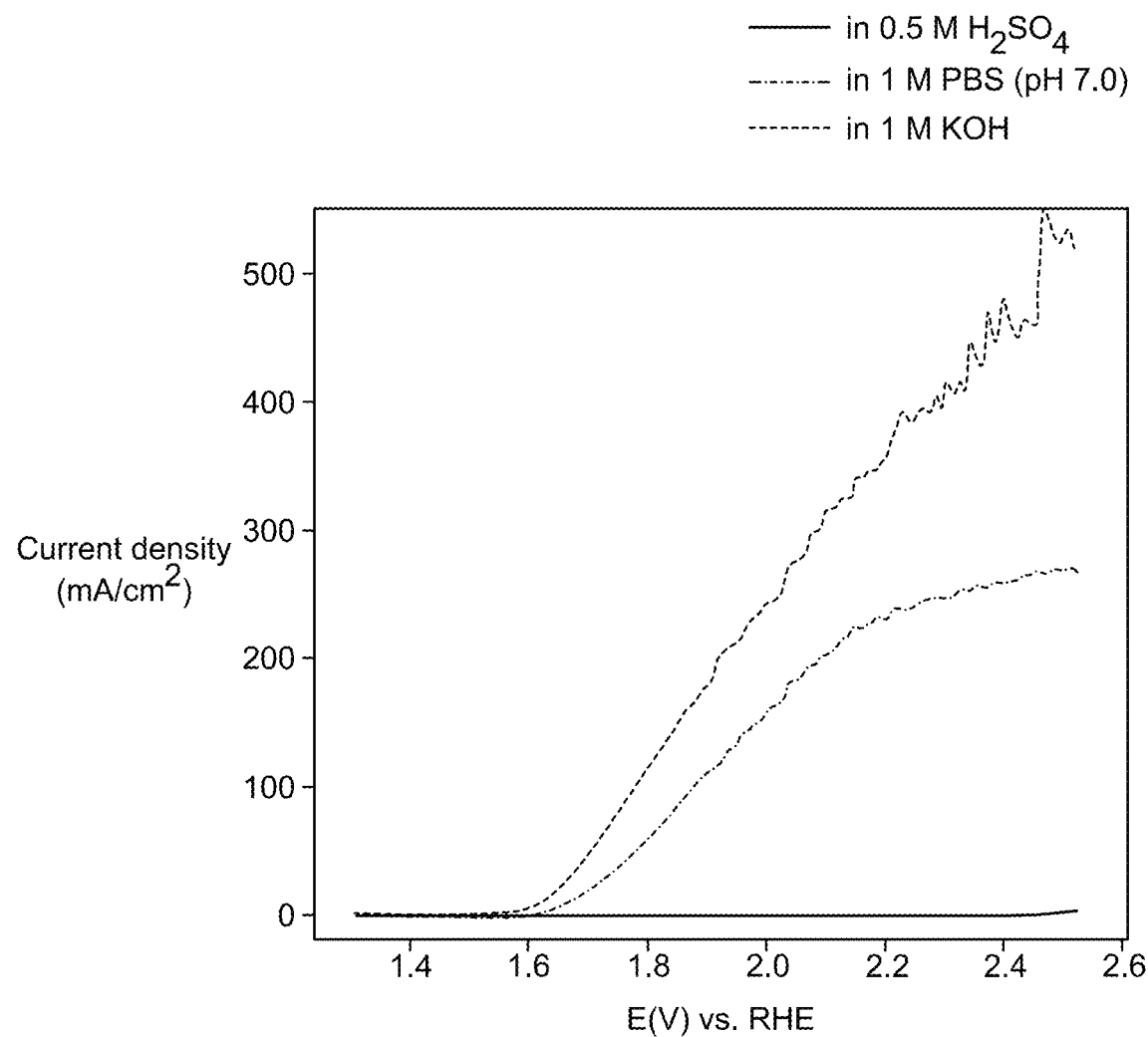
FIG. 6 is a voltammogram obtained in different applied supporting electrolytes.

Electrolytic Water Splitting Studies
The catalytic activity of $CdFe_2Co_3O_8$ for OER In order to develop the OER reaction, the electrolytic process was conducted using electrolytes of varying pH, typically, acidic, medium, and alkaline. The supporting electrolytes examined were 0.5 M sulfuric acid, 1 M phosphate buffer solution (PBS) at pH 7.0, and 1 M KOH. The choice of these supporting electrolytes was based on understanding the likely effects of pH on the performance of the fabricated electrocatalysts on the OER process. FIG. 6 is a voltammogram depicting the effect of pH medium of the different supporting electrolytes on OER activity of the $CdFe_2Co_3O_8$ catalyst. For the OER process, it was observed that the desired supporting electrolyte was 1 M KOH with the lowest overpotential to drive 10 milliampers per square centimeters ($mA/cm^2$). It may possibly be due to the high oxidizing ability of OH— and deficiencies in $H^+$ which could aid reduction reaction. Therefore, 1 M KOH has been employed for all OER-related studies.

Figure 7A:
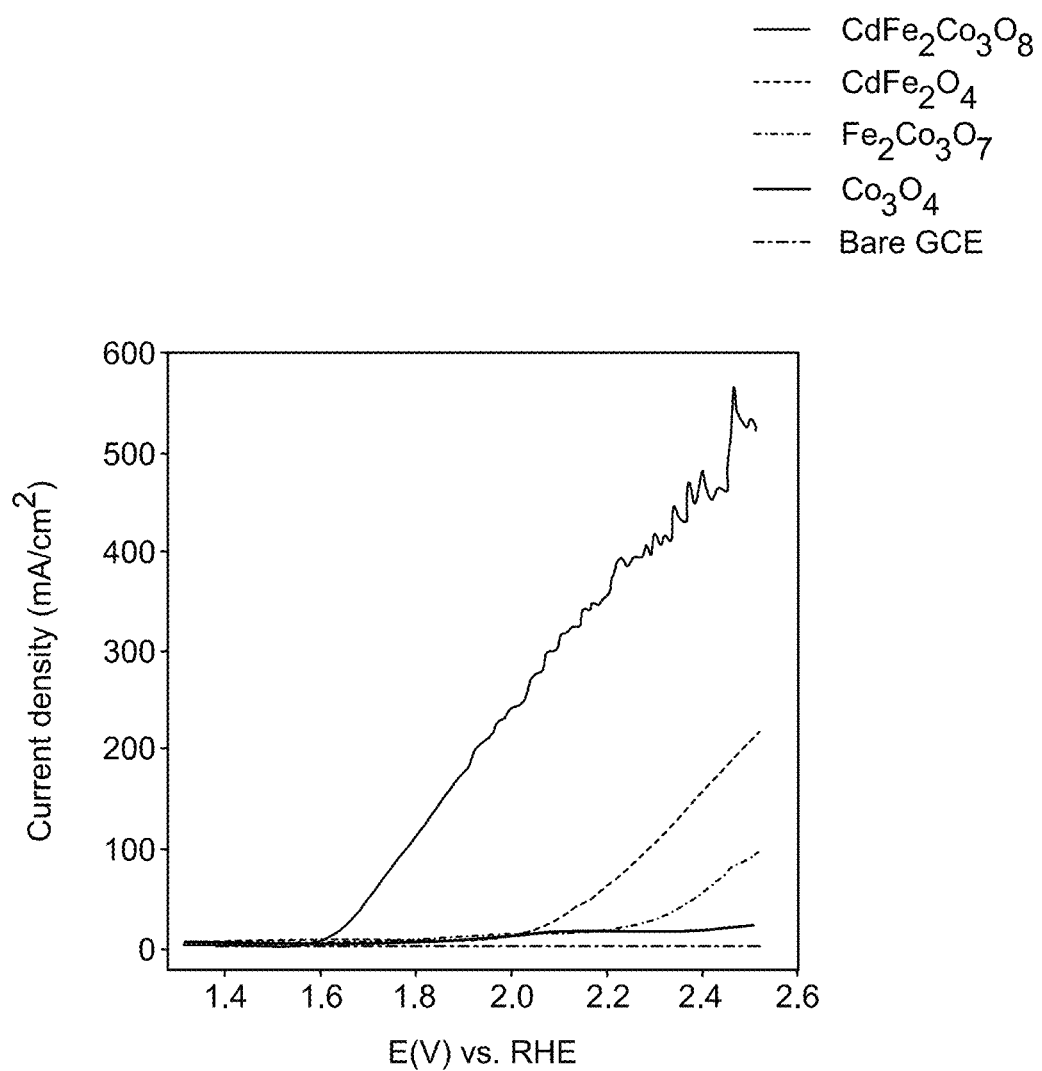
FIG. 7A shows a control study test for the unmodified gold electrode (bare GCE), GE modified with undoped $CO_3O_4$ ($CO_3O_4$), GE modified with $Fe_2Co_3O_7$ ($Fe_2Co_3O_7$), GE modified with $CdFe_2O_4$ ($CdFe_2O_4$) and GE modified with $CdFe_2Co_3O_8$ ($CdFe_2Co_3O_8$) for OER activity.
Figure 7B:
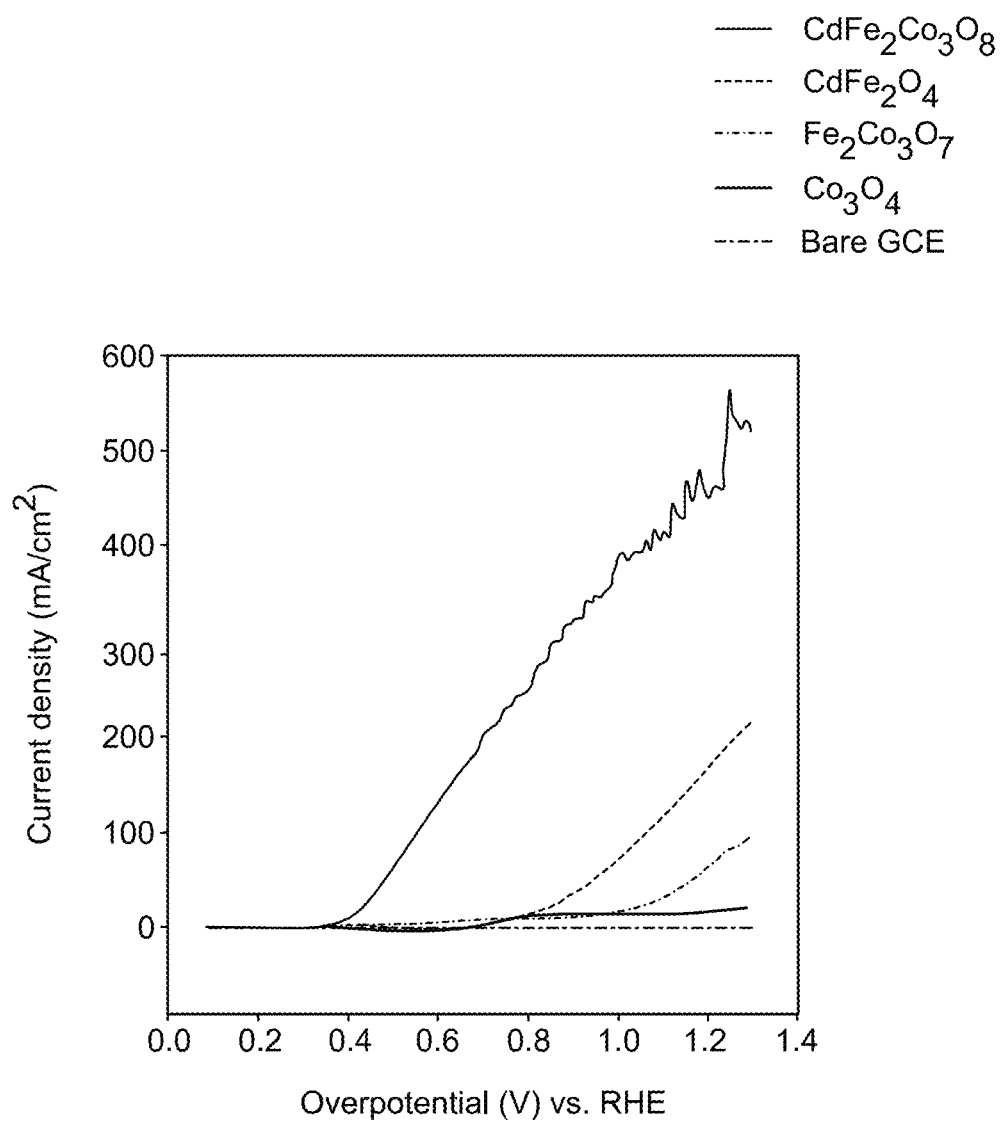
FIG. 7B shows a plot of overpotential against driven current density for the gold electrode, GE modified with undoped $CO_3O_4$ ($CO_3O_4$), GE modified with $Fe_2Co_3O_7$ ($Fe_2Co_3O_7$), GE modified with $CdFe_2O_4$ ($CdFe_2O_4$) and GE modified with $CdFe_2Co_3O_8$ ($CdFe_2Co_3O_8$)
Figure 7C:
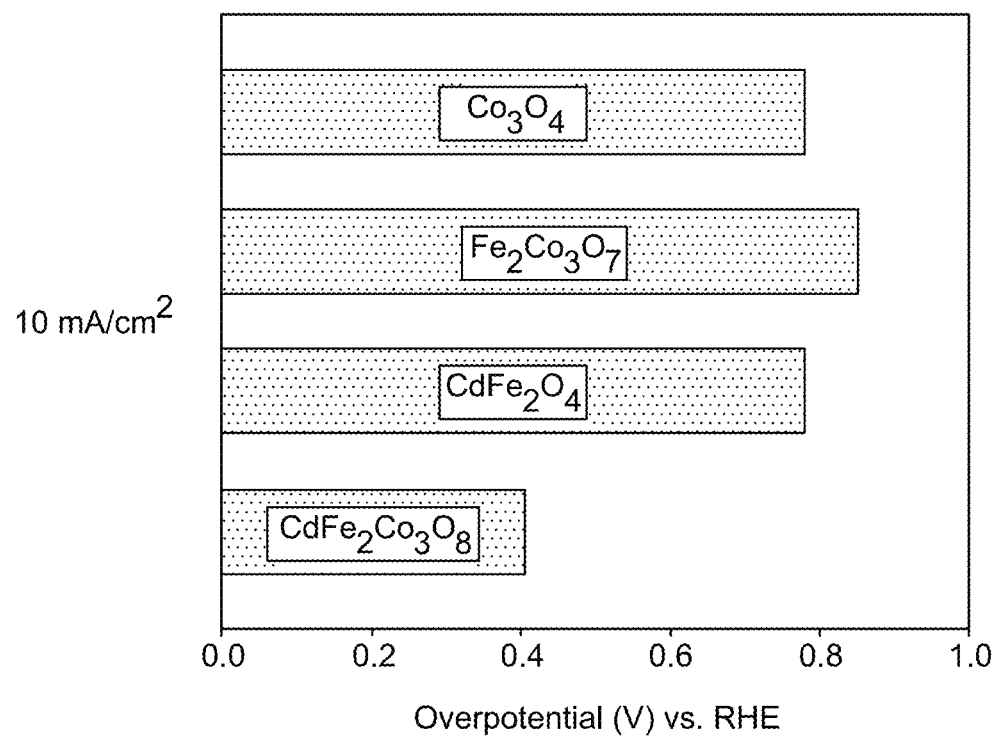
FIG. 7C shows GE modified with undoped $Co_3O_4$ ($Co_3O_4$), GE modified with $Fe_2Co_3O_7$ ($Fe_2Co_3O_7$), GE modified with $CdFe_2O_4$($CdFe_2O_4$) and GE modified with $CdFe_2Co_3O_8$ ($CdFe_2Co_3O_8$)

FIG. 7A shows a control study test for the unmodified or bare gold electrode (GE), GE modified with undoped $CO_3O_4$ ($CO_3O_4$), GE modified with $Fe_2Co_3O_7$ ($Fe_2Co_3O_7$), GE modified with $CdFe_2O_4$ ($CdFe_2O_4$) and GE modified with $CdFe_2Co_3O_8$ ($CdFe_2Co_3O_8$) for OER activity. The obtained result clearly indicates that GE modified with $CdFe_2Co_3O_8$ had the highest current density with the lowest onset potential. (1.60 V), as compared to other electrodes modified with different catalysts. FIG. 7B shows a plot of overpotential against driven current density for the unmodified or bare gold electrode (GE), GE modified with undoped $CO_3O_4$ ($CO_3O_4$), GE modified with $Fe_2Co_3O_7$ ($Fe_2Co_3O_7$), GE modified with $CdFe_2O_4$($CdFe_2O_4$) and GE modified with $CdFe_2Co_3O_8$ ($CdFe_2Co_3O_8$). From the FIG. 7B it can be observed that GE modified with $CdFe_2Co_3O_8$ displayed superior oxygen evolution property at the least overopotential. FIG. 7C shows GE modified with undoped $CO_3O_4$ ($CO_3O_4$), GE modified with $Fe_2Co_3O_7$ ($Fe_2Co_3O_7$), GE modified with $CdFe_2O_4$($CdFe_2O_4$) and GE modified with $CdFe_2Co_3O_8$ ($CdFe_2Co_3O_8$). Conventional 10 mA/cm² was achieved at an overpotential of 403 millivolt (mV) and the corresponding Tafel slope for the catalyst $CdFe_2Co_3O_8$ was 80.7 millivolt per decade (mV/dec). In comparison, the other variants ($Fe_2Co_3O_7$, $CdFe_2O_4$, and $CO_3O_4$) had a Tafel slope of 446 mV/dec, 232 mV/dec, and 348 mV/dec respectively.

Figure 8:
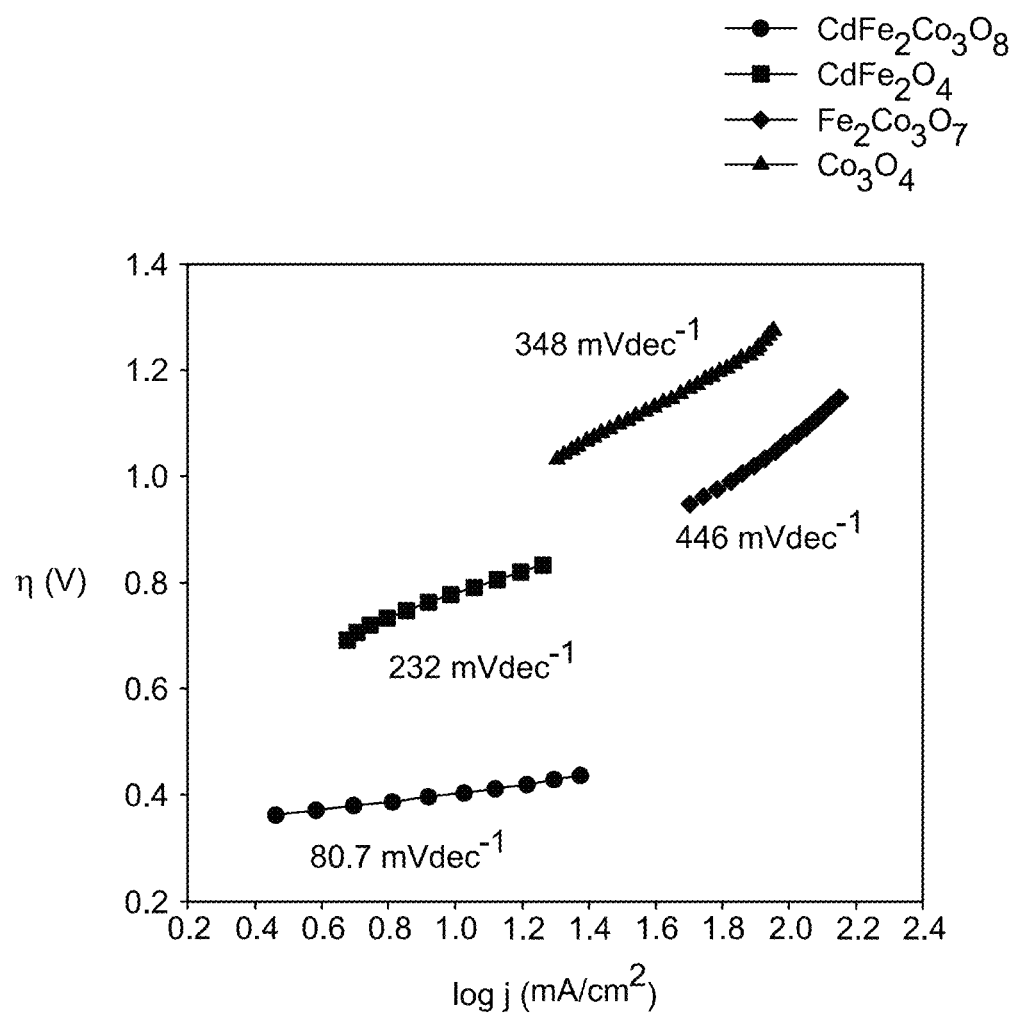
FIG. 8 shows a Tafel plot for OER activity on surface of designed electrocatalysts.

FIG. 8 shows a Tafel plot for OER activity on the surface of designed electrocatalysts. The onset potential for OER reaction catalyzed by the catalyst $CdFe_2Co_3O_8$ was 1.6 V. However, the binary $Fe_2Co_3O_7$ and $CdFe_2O_4$ composites had a much higher onset potential of 2.25 V and 2.02 V respectively. In addition, $CO_3O_4$ had an onset potential at 2.1 V while unmodified gold electrode yielded a current density of less than 2 mA/cm² even at high voltage.

Figure 9:
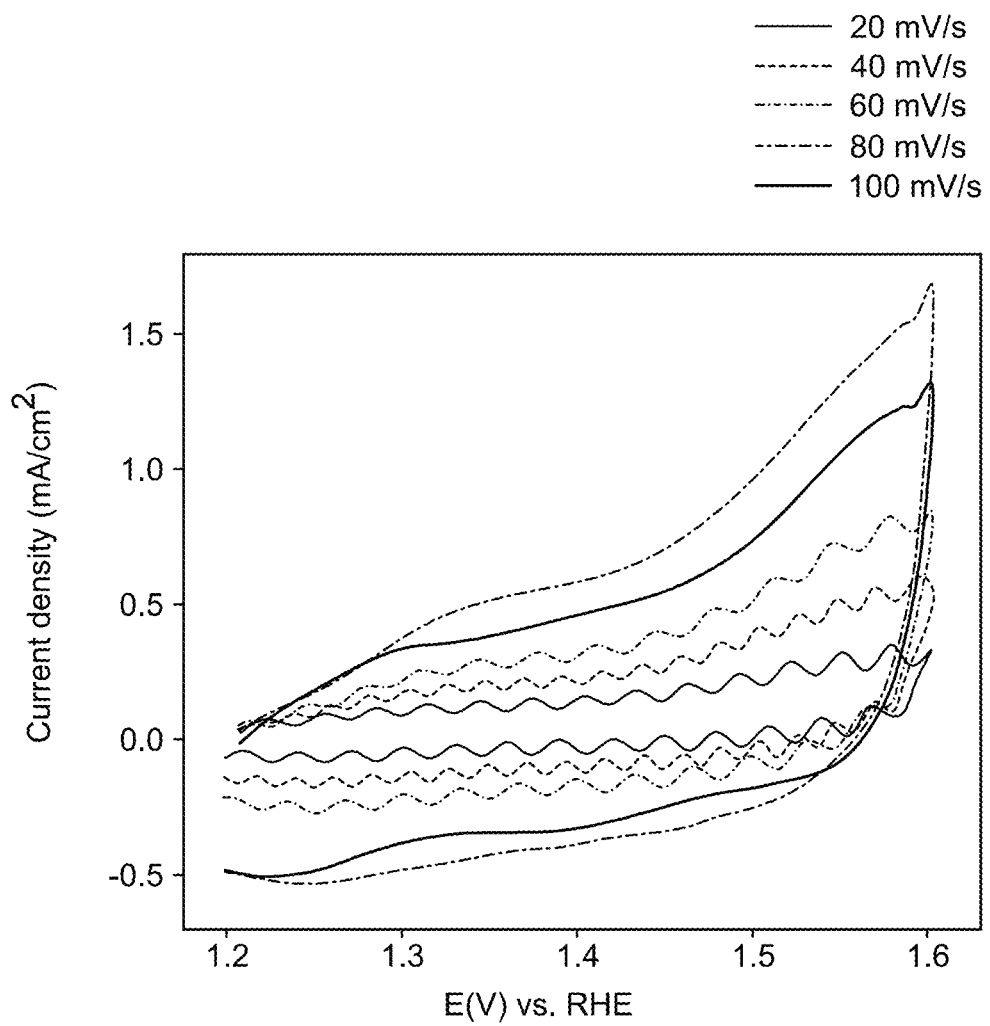
FIG. 9 shows an effect of scan rate on OER and electrochemical double-layer capacitance determination.

FIG. 9 describes the effect of scan rate on OER and electrochemical double-layer capacitance determination. FIG. 9 gives an insight into the surface property of the modified GE as it was used to estimate the electrochemical active surface area (ECSA) of the modified GE.

Figure 10:
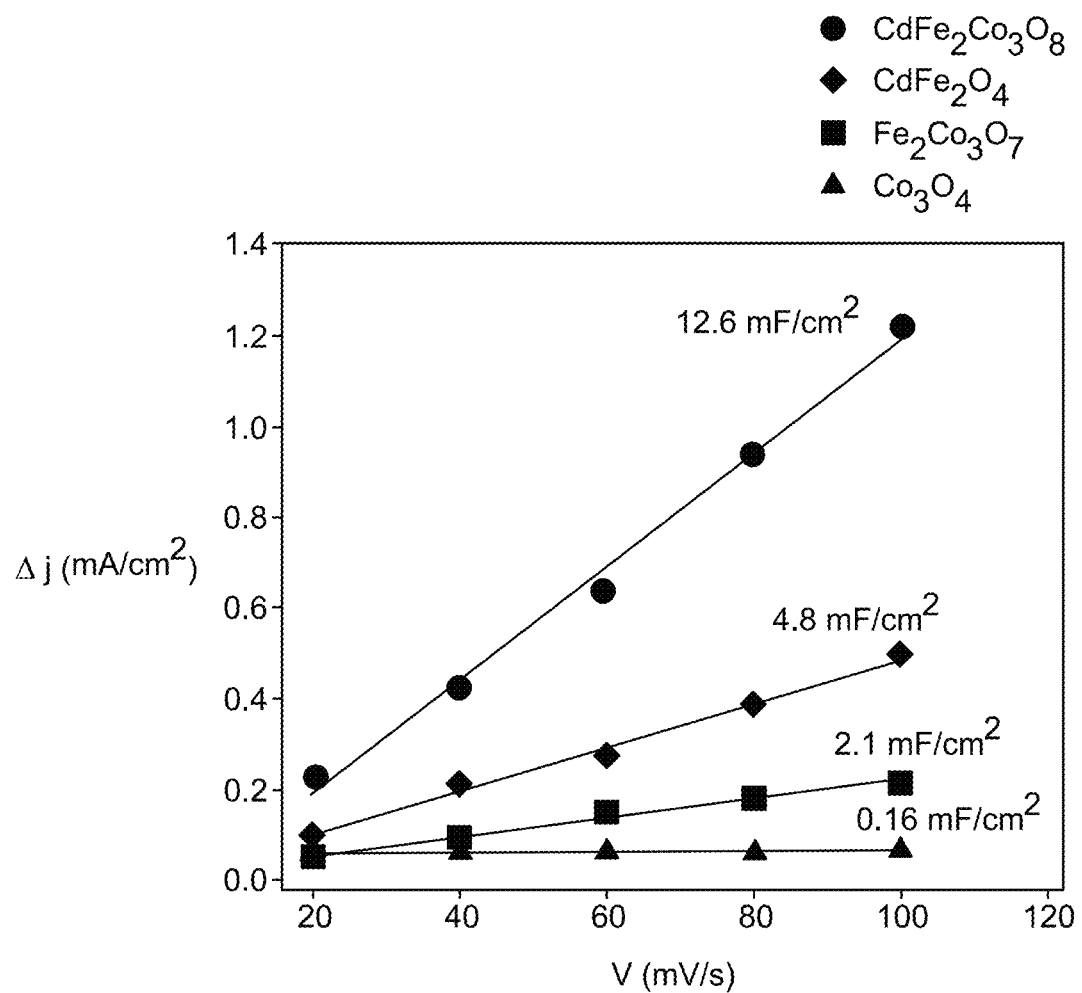
FIG. 10 shows a graph of electrochemically active surface area calculation (ECSA)

FIG. 10 shows a graph of electrochemically active surface area calculation (ECSA). In order to better understand the catalytic activity of $CdFe_2Co_3O_8$, the electrochemically active surface area was determined. As shown in FIG. 10, $CdFe_2Co_3O_8$ has the highest double-layer capacitance (Cdl) value (12.6 mF/cm²) compared to $CdFe_2O_4$ (4.8 mF/cm²), $Fe_2Co_3O_7$ (2.1 mF/cm²) and undoped $CO_3O_4$ (0.16 mF/cm²) corresponding to electrochemical active surface area of 315, 120, 52.5 and 4 respectively.

The obtained ECSA values indicate that the catalyst $CdFe_2Co_3O_8$ has increased ECSA by almost three-fold that of $CdFe_2O_4$ and more than 60 times of $Fe_2Co_3O_7$ and undoped $CO_3O_4$ materials. The high ECSA of $CdFe_2Co_3O_8$ indicates that $CdFe_2Co_3O_8$ has more exposed active sites for catalytic activities. The large ECSA of $CdFe_2Co_3O_8$ may have been a major reason for its high OER activity.

Figure 11:
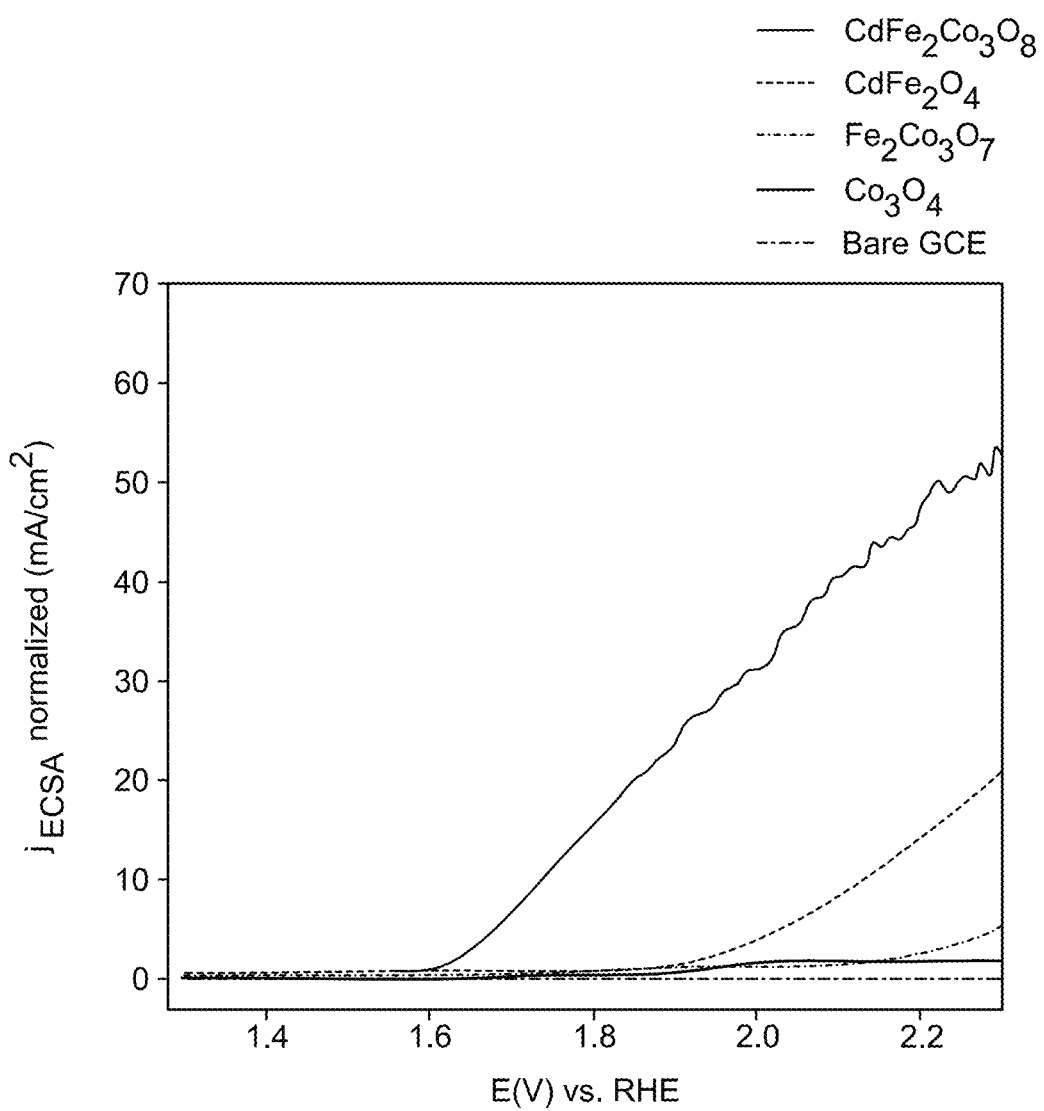
FIG. 11 shows a plot of the effect of ECSA on OER evolution.

FIG. 11 is a plot depicting the effect of ECSA on OER evolution. FIG. 11 gives an insight into the intrinsic activity of the catalyst.

Figure 12:
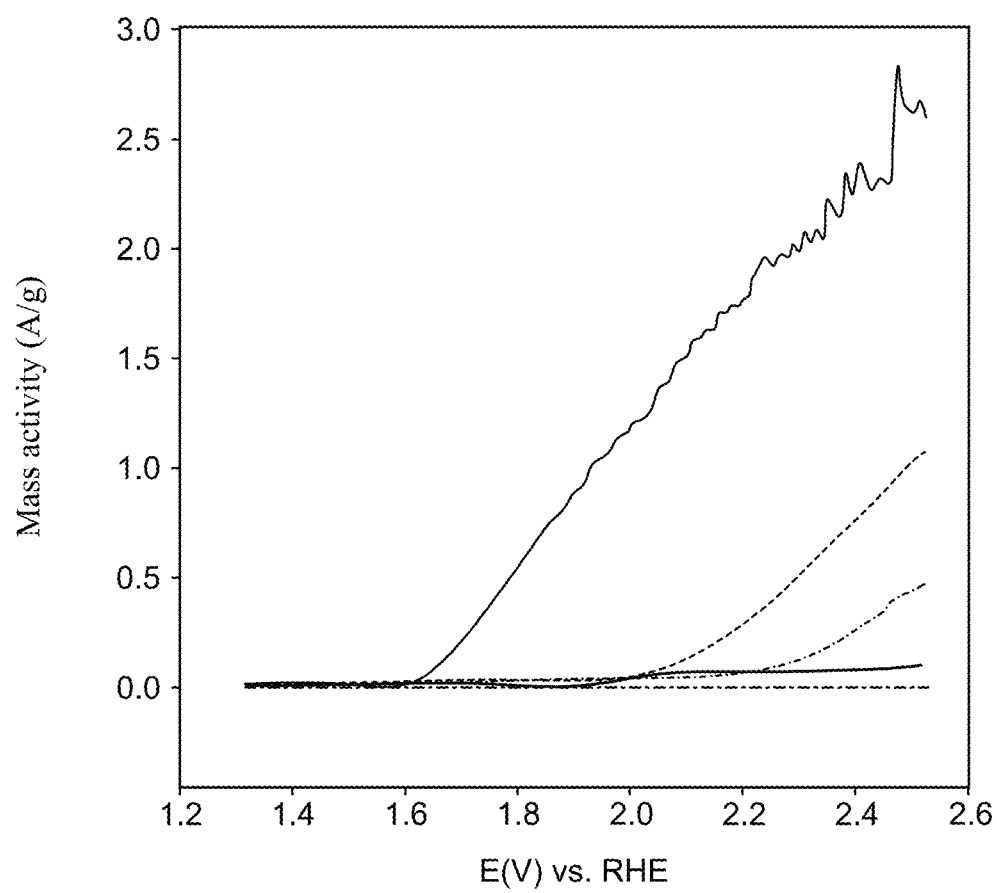
FIG. 12 shows a plot of the effect of the $CdFe_2Co_3O_8$ catalyst loading (mass activity) on OER evolution.
Figure 13:
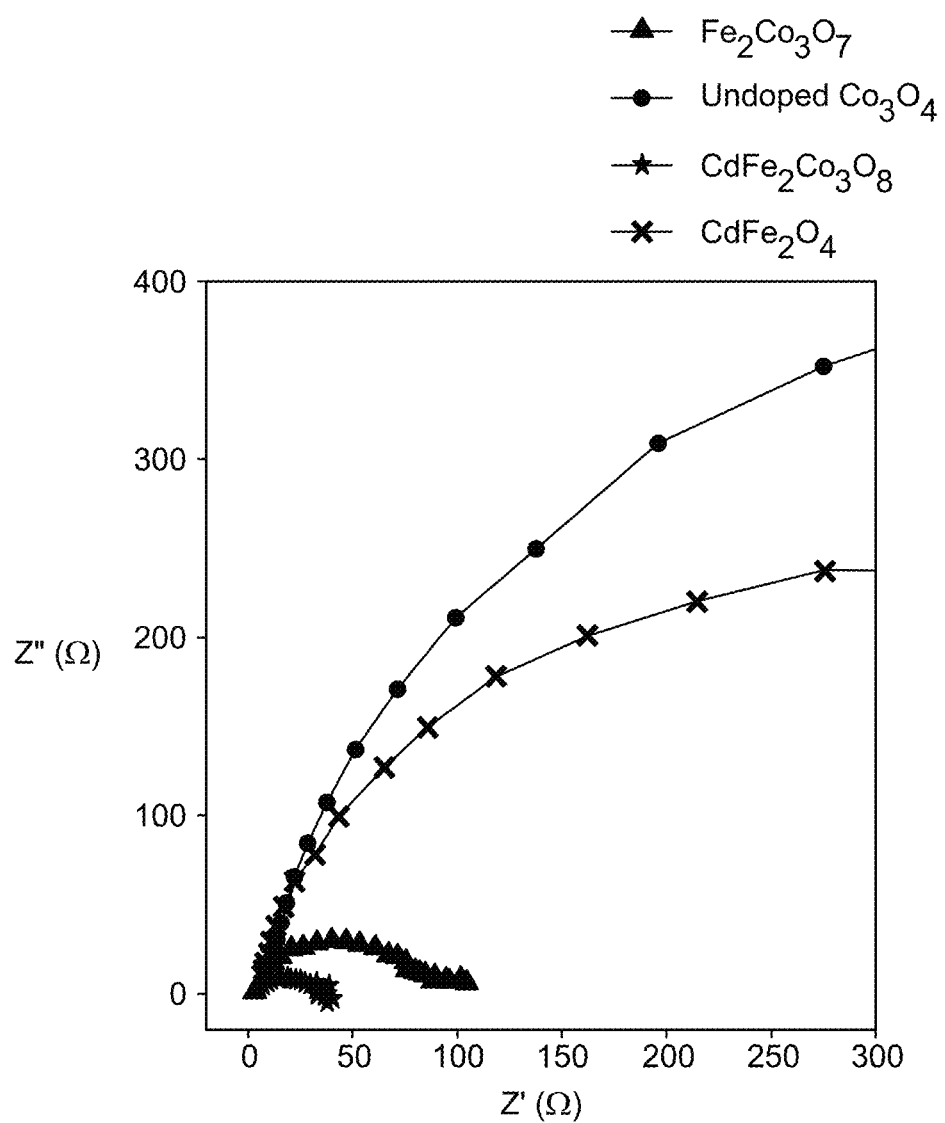
FIG. 13 shows a plot of electrochemical impedance spectra (EIS) obtained at OER onset potential of 1.6 V for the designed electrocatalysts.

FIG. 12 is plot depicting the effect of catalyst loading (mass activity) on OER evolution. From the FIG. 10 and FIG. 11, it can be observed that $CdFe_2Co_3O_8$ exhibits the highest intrinsic OER activity FIG. 13 shows a plot of electrochemical impedance spectra (EIS) obtained at an OER onset potential of 1.6 V for the designed electrocatalysts. In EIS, charge transfer resistance (Rct) denotes the semi-circle, and the smaller its values, the better its electron transfer rate leading to a faster reaction. The observed result indicates the smallest value for charge transfer resistance, Rct was observed for the catalyst $CdFe_2Co_3O_8$ (21.8Ω), much smaller than that of $CdFe_2O_4$ (706.8Ω), $Fe_2Co_3O_7$ (77.2Ω), and undoped $CO_3O_4$ (907.4Ω) at cell potential of 0.815 V. The observed low charge transfer resistance of $CdFe_2Co_3O_8$ can be linked to its excellent OER activity.

The catalytic activity of the catalyst $CdFe_2Co_3O_8$ for HER

Figure 14:
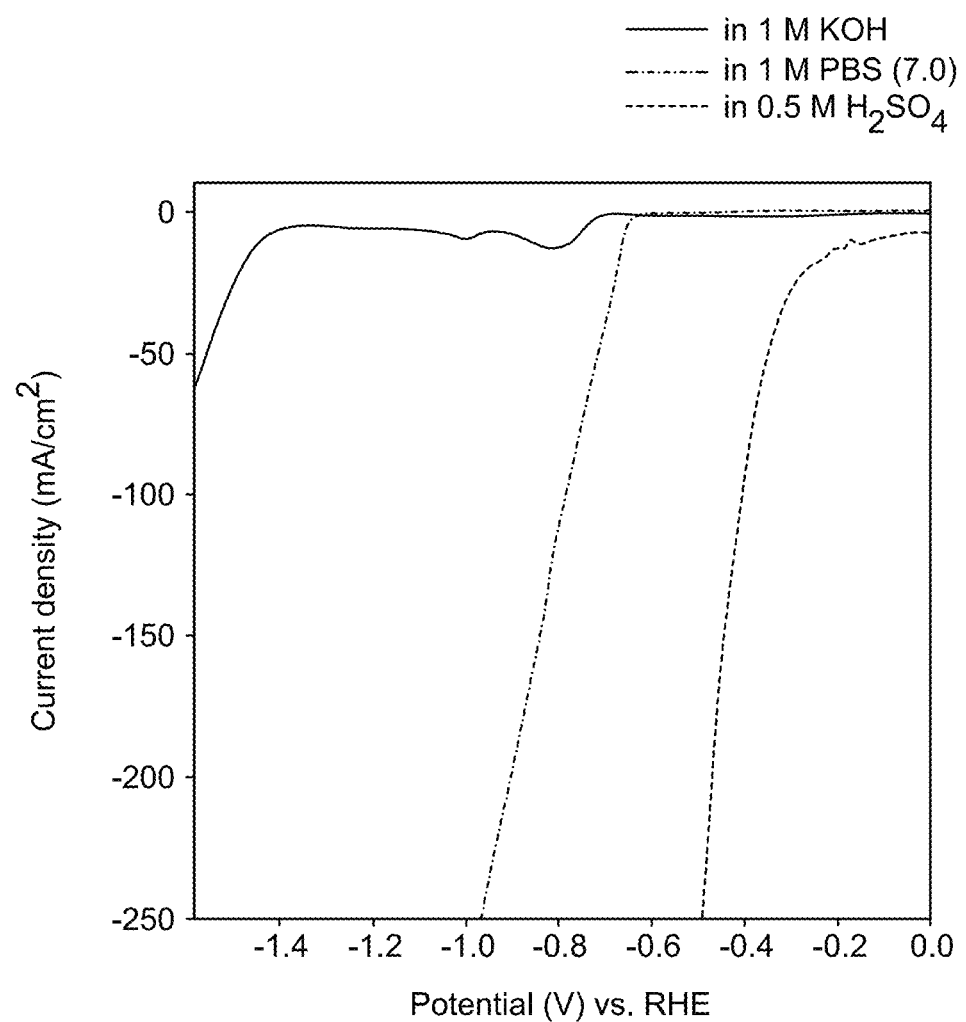
FIG. 14 shows a plot of the effect of supporting electrolytes on HER evolution.

FIG. 14 shows a plot of the effect of supporting electrolytes on HER evolution.

The overpotential in 0.5 M $H_2SO_4$ was 312 mV much smaller than those obtained in 1 M PBS (7.0) and 1 M KOH with overpotentials of 710 mV and 1500 mV respectively. Therefore, 0.5 M $H_2SO_4$ exhibited optimum performance, and was used for HER studies.

Figure 15:
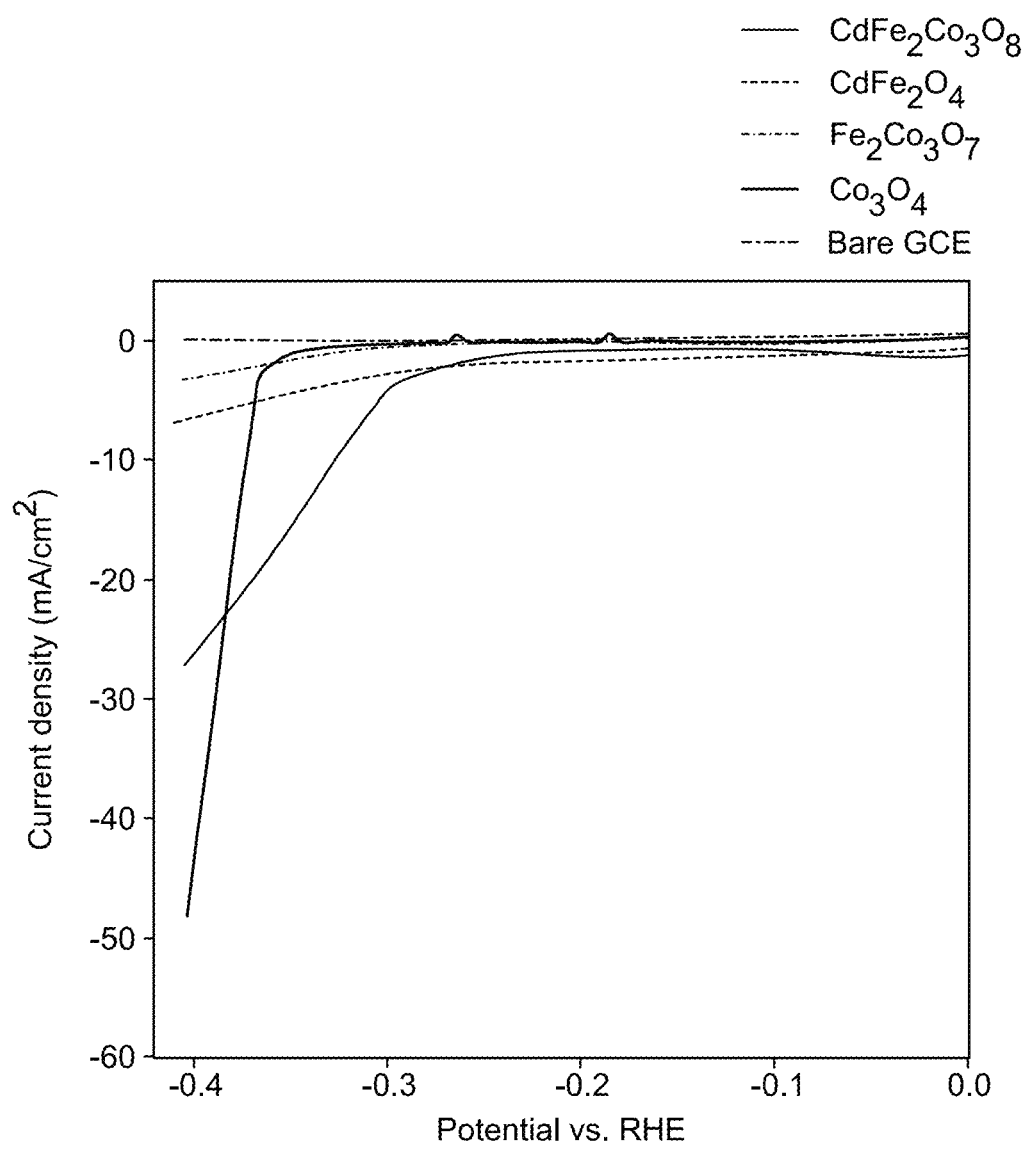
FIG. 15 shows a control study test for the unmodified gold electrode (bare GE), GE modified with undoped $Co_3O_4$ ($Co_3O_4$), GE modified with $Fe_2Co_3O_7$ ($Fe_2Co_3O_7$), GE modified with $CdFe_2O_4$($CdFe_2O_4$) and GE modified with $CdFe_2Co_3O_8$ ($CdFe_2Co_3O_8$) for HER activity.

FIG. 15 shows a control study test for the unmodified or bare gold electrode (GE), GE modified with undoped $CO_3O_4$ ($CO_3O_4$), GE modified with $Fe_2Co_3O_7$ ($Fe_2Co_3O_7$), GE modified with $CdFe_2O_4$($CdFe_2O_4$) and GE modified with $CdFe_2Co_3O_8$ ($CdFe_2Co_3O_8$) for HER activity. It was observed that the abrupt Faradaic reduction current was achieved at an overpotential of 312 mV with the catalyst $CdFe_2Co_3O_8$. At this potential, the recorded current density was 10 mA/cm². However, $Fe_2Co_3O_7$ and $CdFe_2O_4$ displayed current densities of 0.35 mA/cm² and 0.42 mA/cm² respectively at the same overpotential. At the potential of 400 mV, the current density generated by $CdFe_2O_4$, $Fe_2Co_3O_7$, $CO_3O_4$ and bare GE were 8.2 mA/cm², 3.8 mA/cm², 48.8 mA/cm² and 0.15 mA/cm² respectively. Only $CdFe_2Co_3O_8$ catalyst attained a current density of 10 mA/cm² at the lowest overpotential (312 mV).

Figure 16:
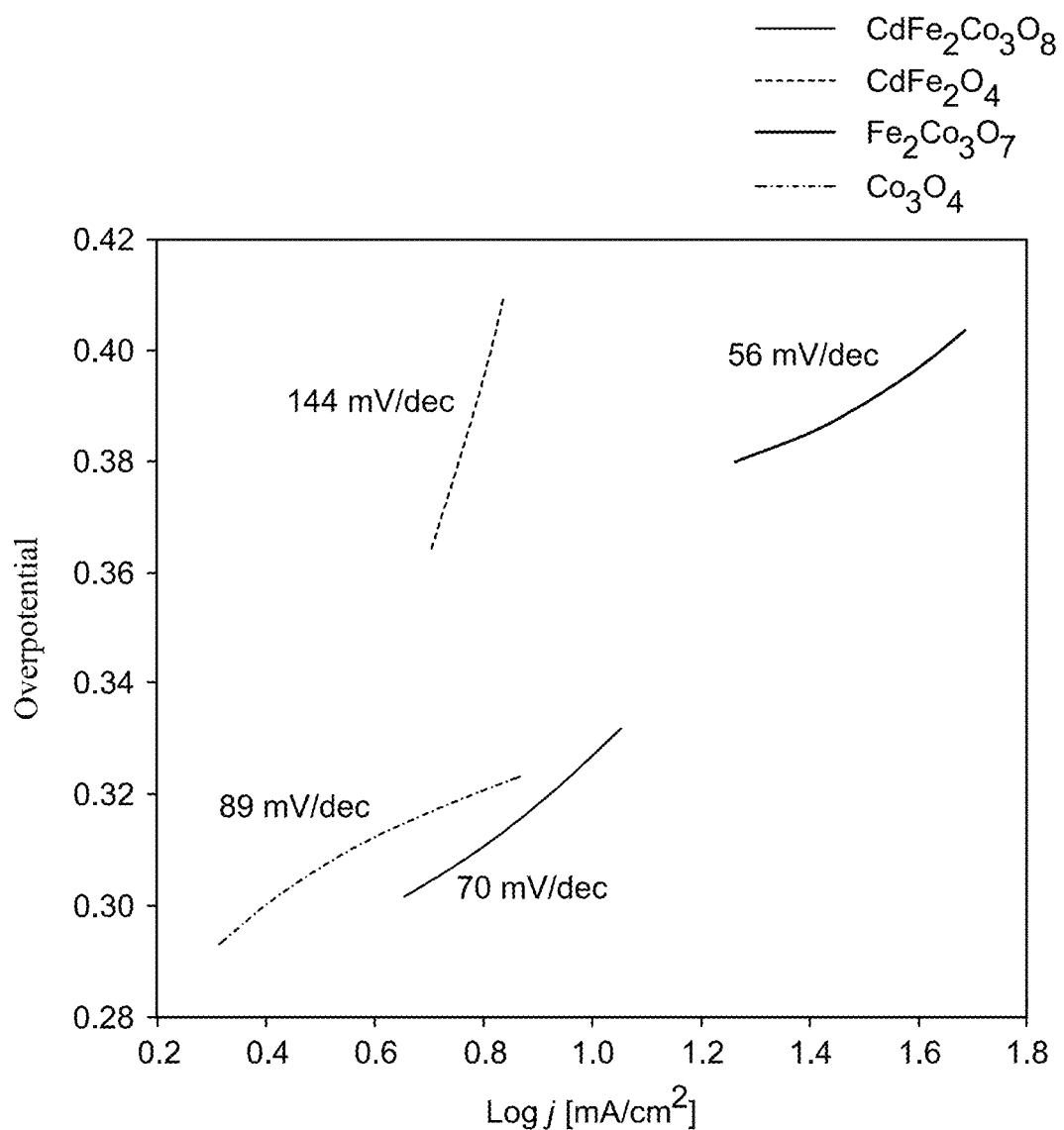
FIG. 16 shows a Tafel plot for HER evolution for GE modified with undoped $Co_3O_4$ ($Co_3O_4$), GE modified with $Fe_2Co_3O_7$ ($Fe_2Co_3O_7$), GE modified with $CdFe_2O_4$ ($CdFe_2O_4$) and GE modified with $CdFe_2Co_3O_8$ ($CdFe_2Co_3O_8$)

FIG. 16 shows a Tafel plot for HER evolution for unmodified or bare gold electrode (GE), GE modified with undoped $CO_3O_4$ ($CO_3O_4$), GE modified with $Fe_2Co_3O_7$ ($Fe_2Co_3O_7$), GE modified with $CdFe_2O_4$($CdFe_2O_4$) and GE modified with $CdFe_2Co_3O_8$ ($CdFe_2Co_3O_8$). The Tafel slope for the catalyst $CdFe_2Co_3O_8$ composite was found to be 56 mV/dec. The value was much lower than those of $CdFe_2O_4$(144 mV/dec) and $CO_3O_4$ (89 mV/dec). However, $Fe_2Co_3O_7$ displayed a lower Tafel slope than $CdFe_2Co_3O_8$. The obtained results imply that HER reactions on the $CdFe_2Co_3O_8$ and $CdFe_2O_4$ occur very fast and follows the Volmer-Heyrovsky process as indicated below:

$$H_3O^+ + e^- \rightarrow H_{ads} + H_2O \quad \text{(Eq. 1)}$$

$$H_{ads} + H_3O^+ + e^- \rightarrow H_2 + H_2O \quad \text{(Eq. 2)}$$

$$H_{ads} + H_{ads} \rightarrow H_2 \quad \text{(Eq. 3)}$$

The Volmer step (Eq. 1), which involves the release of hydroxonium ion and adsorption of intermediate ($H_{ads}$) on the $CdFe_2Co_3O_8$ active site is succeeded by the Heyrovsky step (Eq. 2). In this stage, the discharged hydroxonium ion reacts with adsorbed intermediate ($H_{ads}$) from hydrogen gas.

Figure 17:
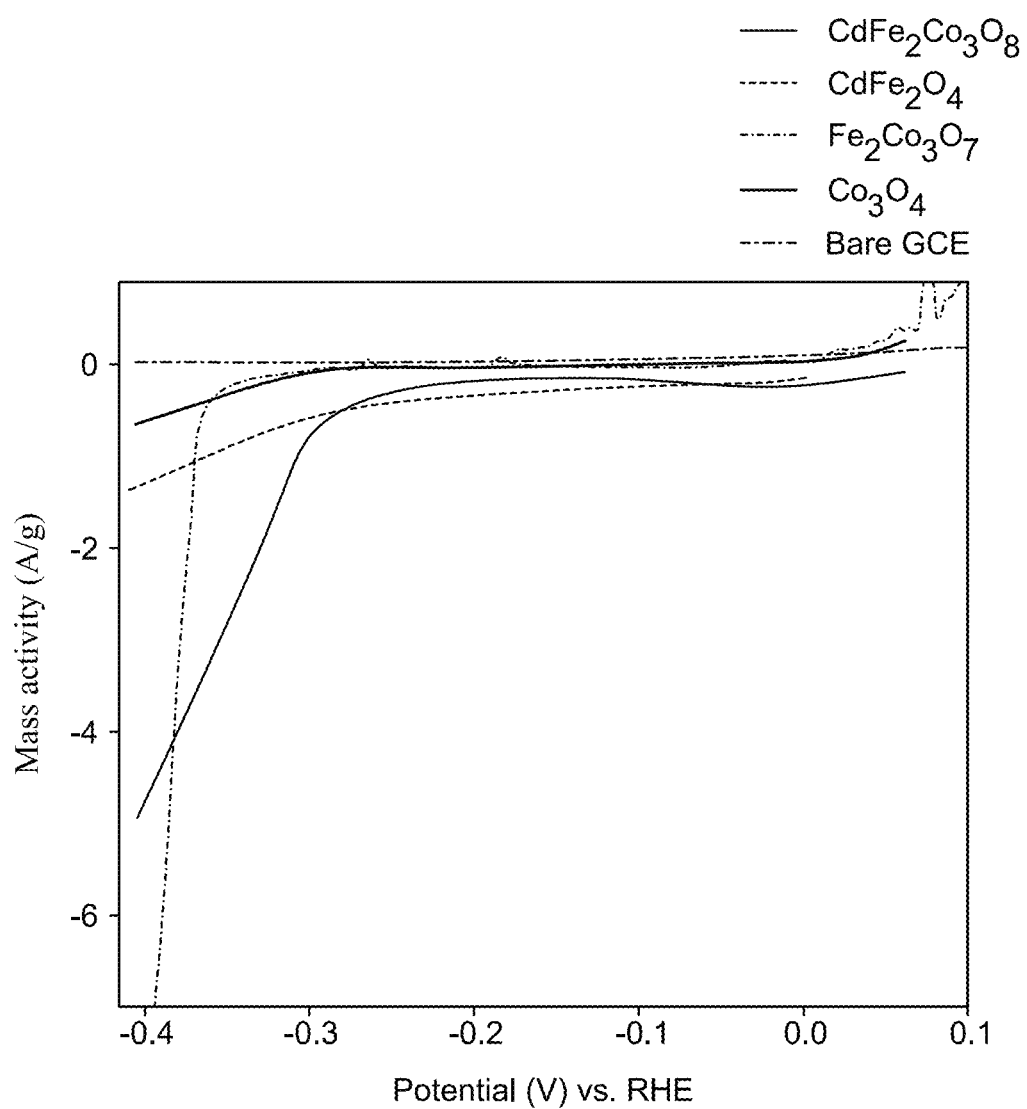
FIG. 17 shows a plot of mass activity on HER evolution for GE modified with undoped $Co_3O_4$ ($Co_3O_4$), GE modified with $Fe_2Co_3O_7$ ($Fe_2Co_3O_7$), GE modified with $CdFe_2O_4$ ($CdFe_2O_4$) and GE modified with $CdFe_2Co_3O_8$ ($CdFe_2Co_3O_8$)

FIG. 17 shows a plot of mass activity on HER evolution for GE modified with undoped $CO_3O_4$ ($CO_3O_4$), GE modified with $Fe_2Co_3O_7$ ($Fe_2Co_3O_7$), GE modified $CdFe_2O_4$ ($CdFe_2O_4$) and $CdFe_2Co_3O_8$ GE modified $CdFe_2Co_3O_8$ ($CdFe_2Co_3O_8$). The result indicates the intrinsic activity of the developed catalyst.

Figure 18:
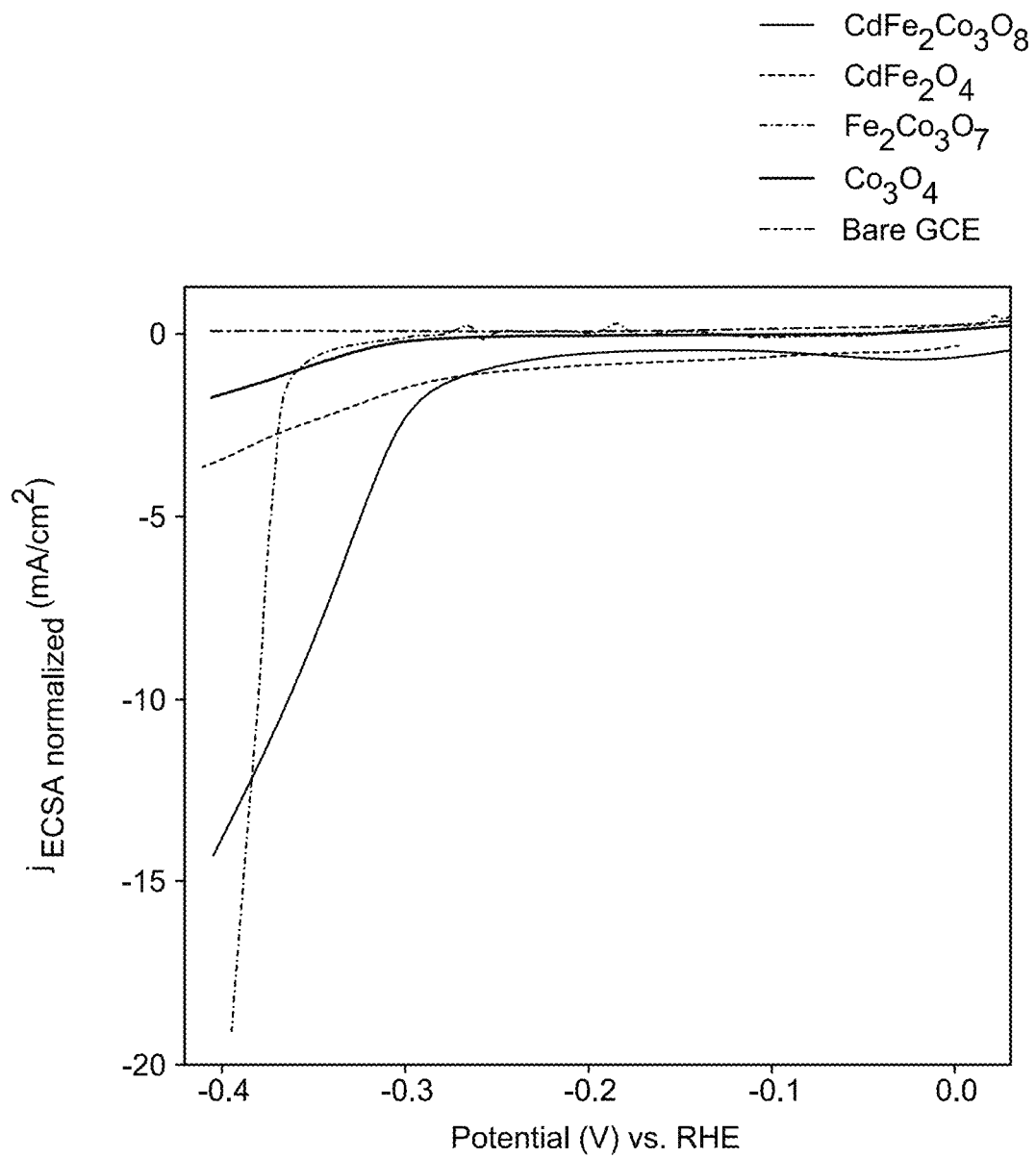
FIG. 18 shows a plot of ECSA effect on HER evolution for GE modified with undoped $Co_3O_4$ ($Co_3O_4$), GE modified with $Fe_2Co_3O_7$ ($Fe_2Co_3O_7$), GE modified with $CdFe_2O_4$ ($CdFe_2O_4$) and GE modified with $CdFe_2Co_3O_8$ ($CdFe_2Co_3O_8$)

FIG. 18 shows a plot of ECSA effect on HER evolution for GE modified with undoped $CO_3O_4$ ($CO_3O_4$), GE modified with $Fe_2Co_3O_7$ ($Fe_2Co_3O_7$), GE modified $CdFe_2O_4$ ($CdFe_2O_4$) and $CdFe_2Co_3O_8$ GE modified $CdFe_2Co_3O_8$ ($CdFe_2Co_3O_8$). The result indicates the intrinsic activity of the developed catalyst. Moreover, the superior HER activity of the catalyst $CdFe_2Co_3O_8$ is also supported by mass and ECSA normalized current densities. The high ECSA of the as-synthesized $CdFe_2Co_3O_8$ catalyst could be related to enhanced anion exchangeability between $CdFe_2Co_3O_8$ active sites and the electrolyte solution. These two properties of low charge transfer resistance and improved ECSA play a major role in the excellent OER and HER activities of $CdFe_2Co_3O_8$ ternary composites.

Figure 19:
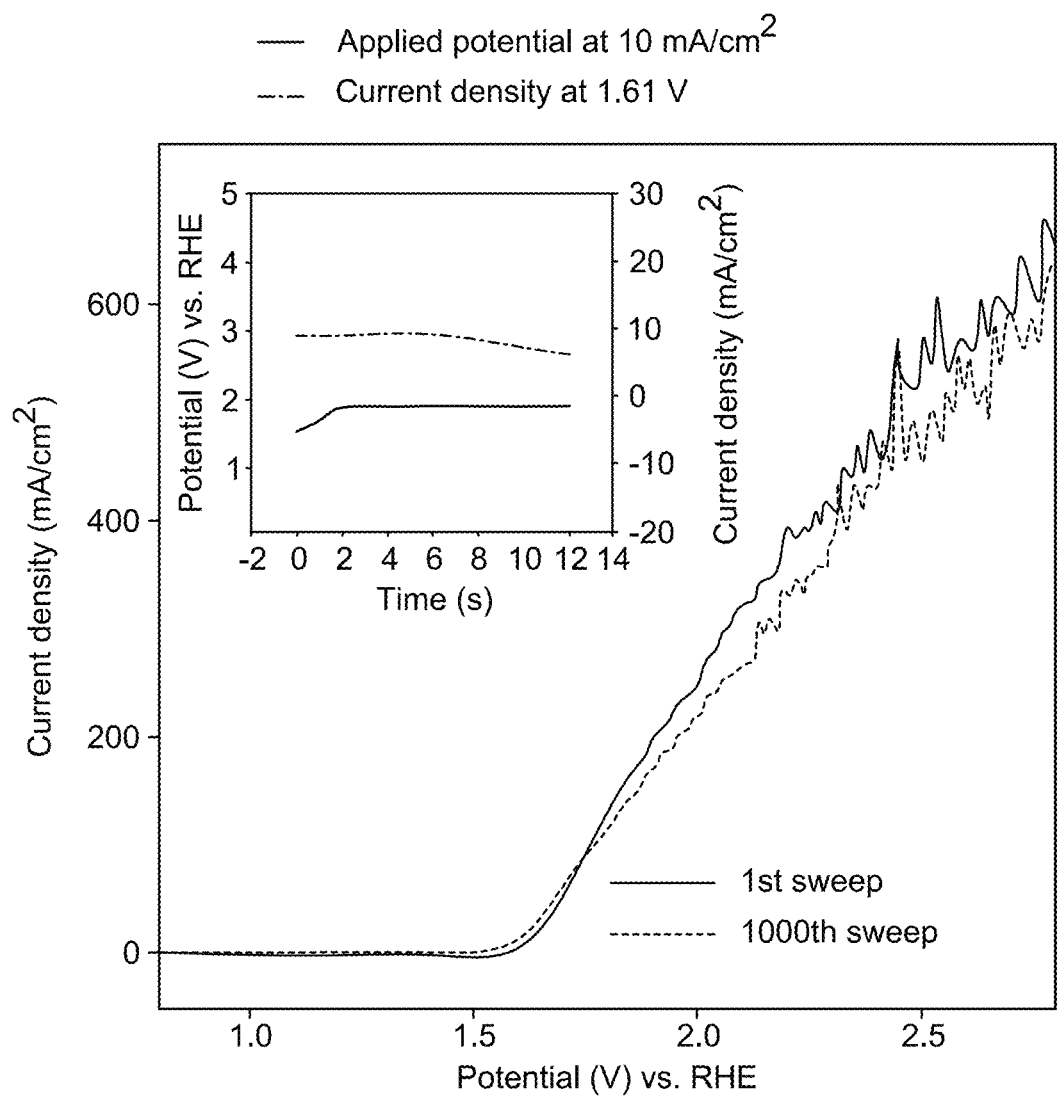
FIG. 19 shows a plot of OER stability assessment (inset—chronoamperometric and chronopotentiometric studies)

FIG. 19 shows a plot of OER stability assessment (inset—chronoamperometric and chronopotentiometric studies). For OER activity, the current density dropped by about 12% after 1000 cycles/sweeps continuous use. The OER current stability was also assessed by potentiodynamic and potentiostatic methods. The potentiostatic current density measurement dropped by 36% after 12 hours of continuous measurement. The chronopotentiometric measurement revealed a 38% potential increase after 12 hours of continuous measurement. Similarly for HER activity, the current density dropped by 15% after 1000 cycles, which implies that the catalyst has longer stability.

Figure 20:
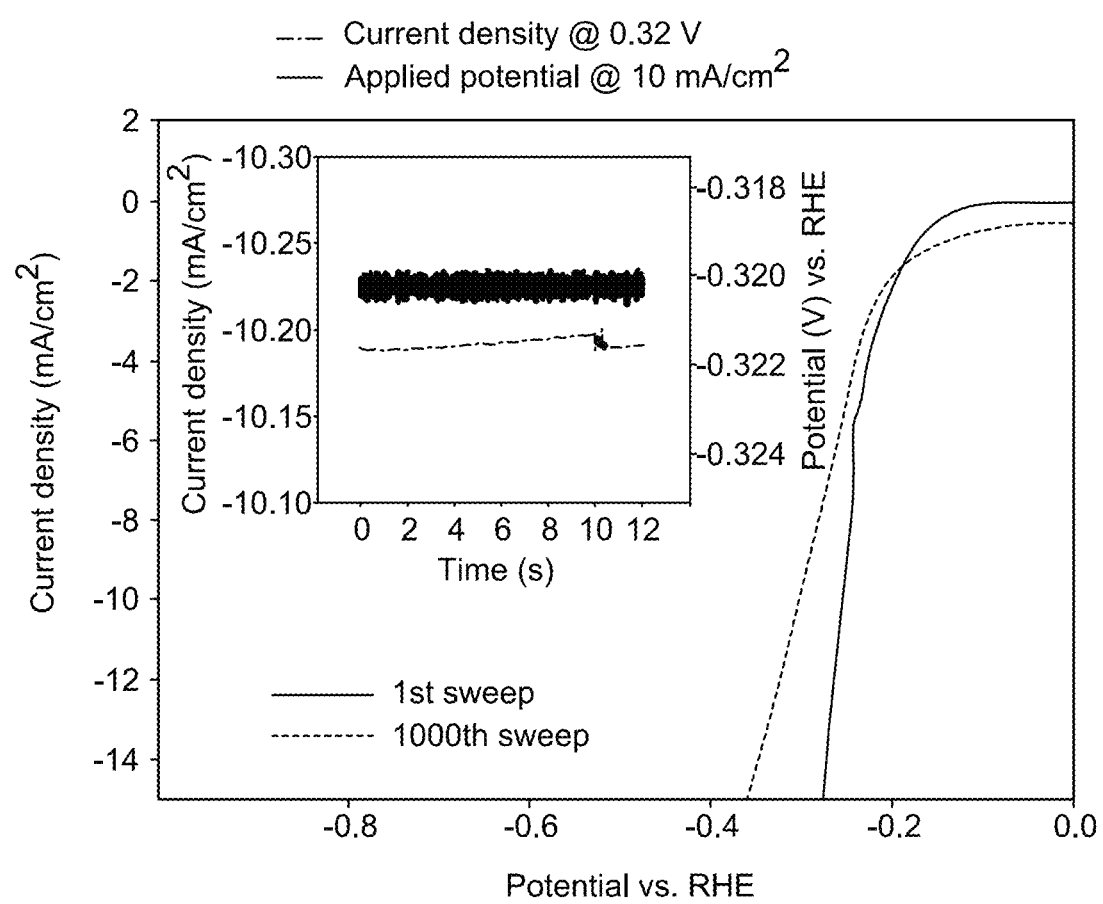
FIG. 20 shows a plot of OER stability assessment (inset—chronoamperometric and chronopotentiometric studies).

FIG. 20 shows a plot of OER stability assessment (inset—chronoamperometric and chronopotentiometric studies). The potentiostatic current density measurement dropped by only 3% after 12 hours of continuous measurement, suggesting that the catalyst is stable upto 12 hours. The chronopotentiometric measurement revealed 98% potential retainment after 12 hours of continuous measurement.

Over the years the stability of electrocatalysts has been a major concern. Typical non-noble metal catalysts face the drawback of instability over long hours (typically 12 hours and beyond). However, the catalyst of the present disclosure revealed that the $CdFe_2Co_3O_8$ composite is stable for OER and HER activities for at least 12 hours of use.

INDUSTRIAL APPLICABILITY

The catalyst of the present disclosure offers several advantages over the prior art for the electrocatalysis of water to produce hydrogen and oxygen. The catalyst is made up of non-noble metal oxides that are inexpensive and easy to obtain. Also, the catalyst of the present disclosure allows for the process to be performed at a substantially larger scale in comparison to the methods known in the art. One advantage of the embodiments according to the present disclosure is that the catalyst operates at low overpotential for OER and HER activities. Unlike other methods based on hydrothermal, solvo-thermal, chemical precipitation and chemical vapour deposition, solid-state synthesis of nanomaterials offer the several advantageous properties and has been proven to reveal much more active sites of the synthesized materials. The properties are as under:

i) The synthesized catalyst displayed a uniform; highly ordered cubic surfaces well characterized with X-ray diffraction spectroscopy (XRD), field emission scanning electron microscopy (FESEM), energy dispersive X-ray spectroscopy (XEDS), X-ray photoelectron spectroscopy (XPS) and Fourier transform infrared spectroscopy (FTIR). The synthesized catalyst $CdFe_2Co_3O_8$ displayed orderliness as indicated by XRD spectrum. Successful intercalation of the metal precursors was also revealed by XPS and XEDS spectra.

ii) The developed catalyst displayed a surprisingly and unexpectedly high current density of 10 mA/cm² at an overpotential of 403 mV for OER in alkaline medium. Moreover, the observed current density for HER at an overpotential of 312 mV was 10 mA/cm². The synthesized catalyst $CdFe_2Co_3O_8$ outperformed several-reported effective HER catalysts.

iii) The unique stability of the catalyst $CdFe_2Co_3O_8$ was established by chronoamperometric and potentiodynamic current density with time. The synthesized material displayed high current stability for HER and OER even after 12 hours of continuous run. As against most in-use water electro-catalysts (especially cobalt-based materials) that decay at about 10 hours, the catalyst $CdFe_2Co_3O_8$ maintained high stability of initial current density for OER and HER even after a continuous 12-hour reaction.

It is understood that the examples, embodiments, and teachings presented in this application are described merely for illustrative purposes. Any variations or modifications thereof are to be included within the scope of the present application as discussed.

ACKNOWLEDGMENT

The inventors extend their appreciation to the Deputyship for Research & Innovation, Ministry of Education in Saudi Arabia for funding this research work through the project number "2021-101" and King Abdulaziz University, DSR, Jeddah, Saudi Arabia

The invention claimed is:

1. A catalyst comprising oxides of cadmium, iron, and cobalt, represented by a general formula $CdFe_{2-3}Co_{1-3}O_{5-9}$.

2. The catalyst according to claim 1, wherein the iron oxide is iron (II) oxide, iron (III) oxide, or iron (II, III) oxide.

3. The catalyst according to claim 1, wherein the iron oxide is iron (II) oxide.

4. The catalyst according to claim 1, wherein the cobalt oxide is cobalt (II) oxide, cobalt (III) oxide, cobalt (II, III) oxide, and combination thereof.

5. The catalyst according to claim 1, is $CdFe_2Co_3O_8$.

6. The catalyst according to claim 5, has an average crystalline size of about 72 nanometers.

7. The catalyst according to claim 1, wherein the cadmium oxide, cobalt oxide, and iron oxide are non-porous cubic nanostructures, and wherein the nanostructures include at least one selected from nanowires, nanoparticles, nanoclusters, nanocrystals, or combinations thereof.

8. The catalyst according to claim 1, wherein the cadmium oxide has a weight percentage of 24.32%, the cobalt oxide has a weight percentage of 45.59%, and the iron oxide has a weight percentage of 30.23%.

9. An electrocatalyst comprising: a conductive electrode dispersed with the catalyst according to claim 1.

10. The electrocatalyst according to claim 9 for use in the water-splitting process.

11. The electrocatalyst according to claim 9, wherein the conductive electrode is a gold electrode.

12. An electrocatalyst comprising: a conductive electrode dispersed with the catalyst according to claim 5.

* * * * *